(12) United States Patent
Jitaru

(10) Patent No.: US 6,862,195 B2
(45) Date of Patent: Mar. 1, 2005

(54) SOFT TRANSITION CONVERTER

(75) Inventor: Ionel Jitaru, Tucson, AZ (US)

(73) Assignee: Delta Energy Systems (Switzerland) AG (CH)

( * ) Notice: Subject to any disclaimer, the term of this patent is extended or adjusted under 35 U.S.C. 154(b) by 0 days.

(21) Appl. No.: 09/260,478

(22) Filed: Mar. 1, 1999

(65) Prior Publication Data

US 2002/0001203 A1 Jan. 3, 2002

(51) Int. Cl.[7] .............................................. H02M 3/335
(52) U.S. Cl. ........................... 363/17; 363/98; 363/132
(58) Field of Search .............................. 363/15–17, 98, 363/132

(56) References Cited

U.S. PATENT DOCUMENTS

| | | | | |
|---|---|---|---|---|
| 2,866,909 A | * | 12/1958 | Trousdale | 327/478 |
| 4,435,750 A | * | 3/1984 | Schutten et al. | 363/177 |
| 4,564,897 A | * | 1/1986 | Okamoto et al. | 363/132 |
| 4,651,265 A | * | 3/1987 | Stacey et al. | 363/35 |
| 4,864,479 A | * | 9/1989 | Steigerwald et al. | 363/17 |
| 4,991,075 A | * | 2/1991 | Saitou et al. | 363/15 |
| 5,359,277 A | * | 10/1994 | Cowett | 323/207 |
| 5,510,972 A | * | 4/1996 | Wong | 363/125 |
| 5,555,494 A | * | 9/1996 | Morris | 363/17 |
| 5,638,260 A | * | 6/1997 | Bees | 363/17 |
| 5,793,624 A | * | 8/1998 | Couture et al. | 363/47 |
| 5,838,558 A | * | 11/1998 | Tan et al. | 363/91 |
| 5,877,951 A | * | 3/1999 | Mweene | 363/98 |
| 5,963,436 A | * | 10/1999 | Yoshida | 363/17 |
| 5,969,481 A | * | 10/1999 | Konopka | 315/209 R |
| 6,038,142 A | * | 3/2000 | Fraidlin et al. | 363/17 |
| 6,091,616 A | * | 7/2000 | Jacobs et al. | 363/127 |
| 6,324,080 B1 | * | 11/2001 | Laeuffer | 363/25 |

* cited by examiner

Primary Examiner—Gary L. Laxton
(74) Attorney, Agent, or Firm—Birdwell & Janke, LLP

(57) ABSTRACT

The present invention is a circuit and method for reducing switching and reverse recovery losses in the output rectifiers while creating zero voltage switching conditions for the primary switchers. There are described two output configurations, one employing a soft commutation inductor element a bridge rectifier and a output filter capacitor, the second using a soft commutation inductor element a rectification-filtering bridge composed by two capacitors and two capacitors. Both secondary circuits can be driven by three primary circuits. A first circuit is a full bridge with phase shift control, and a second circuit is a half bridge topology with an additional bydirectional switch which achieves two goals, on to get soft switching commutation across all the primary switches, the second to create the right waveforms in the secondary suitable with the claims in this invention. The third topology is a phase shifted two transistors forward. The circuits claimed in this invention can provide soft commutation across the primary switching elements and secondary rectifier means, clamping the voltage across the rectifiers to the output voltage eliminating the need for snubbers circuits both in primary and the secondary section.

54 Claims, 16 Drawing Sheets

Fig. 1B
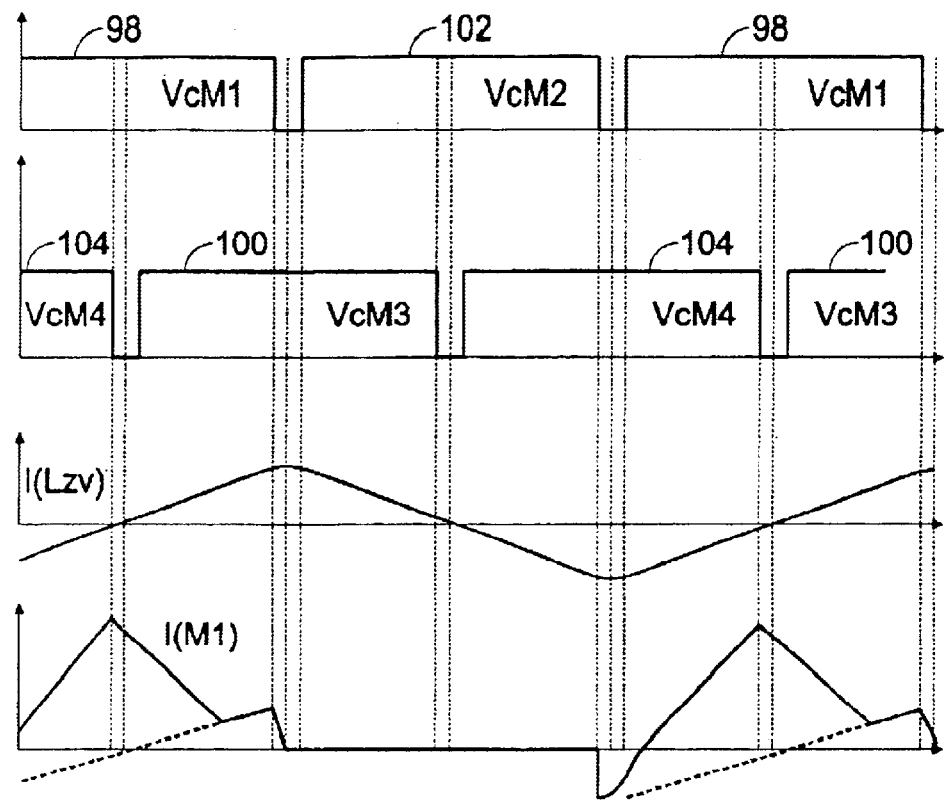
Fig. 2 *(PRIOR ART)*
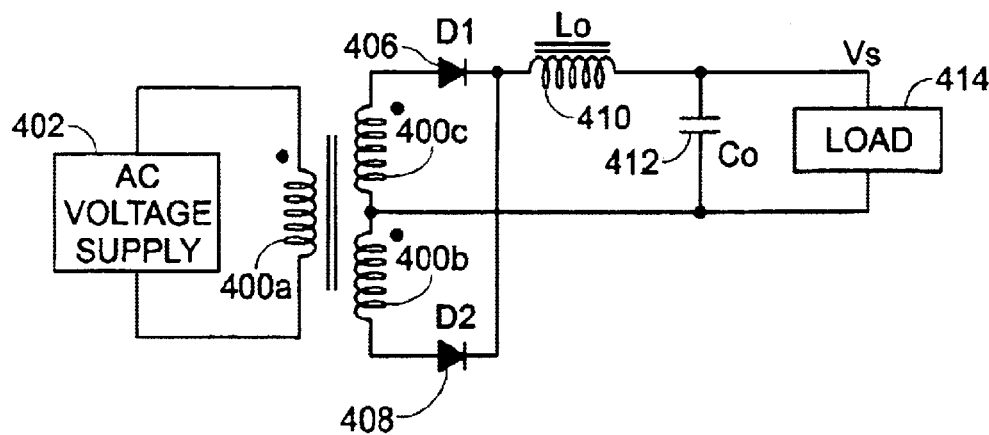

Fig. 3A *(PRIOR ART)*
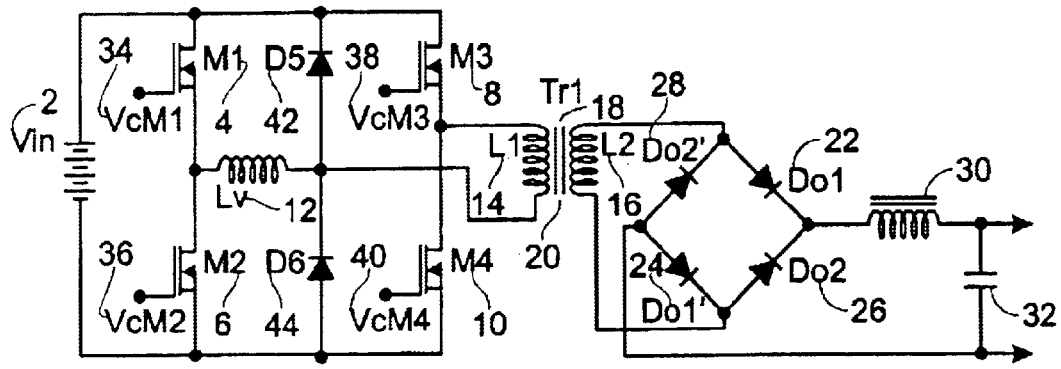
Fig. 3B *(PRIOR ART)*
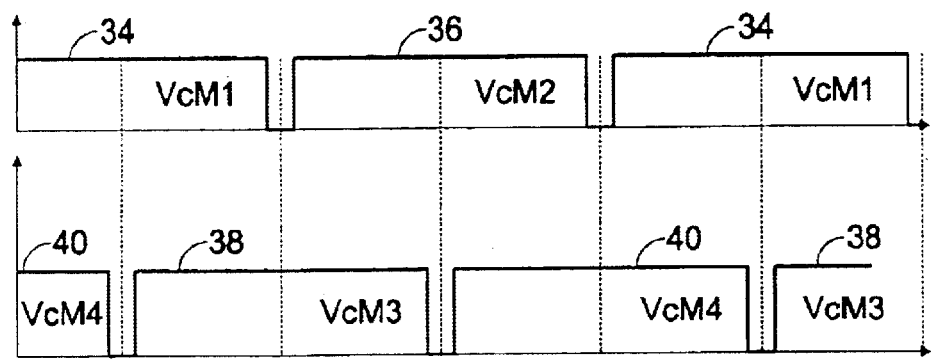
Fig. 4A
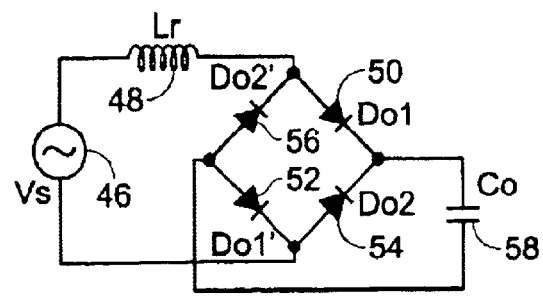

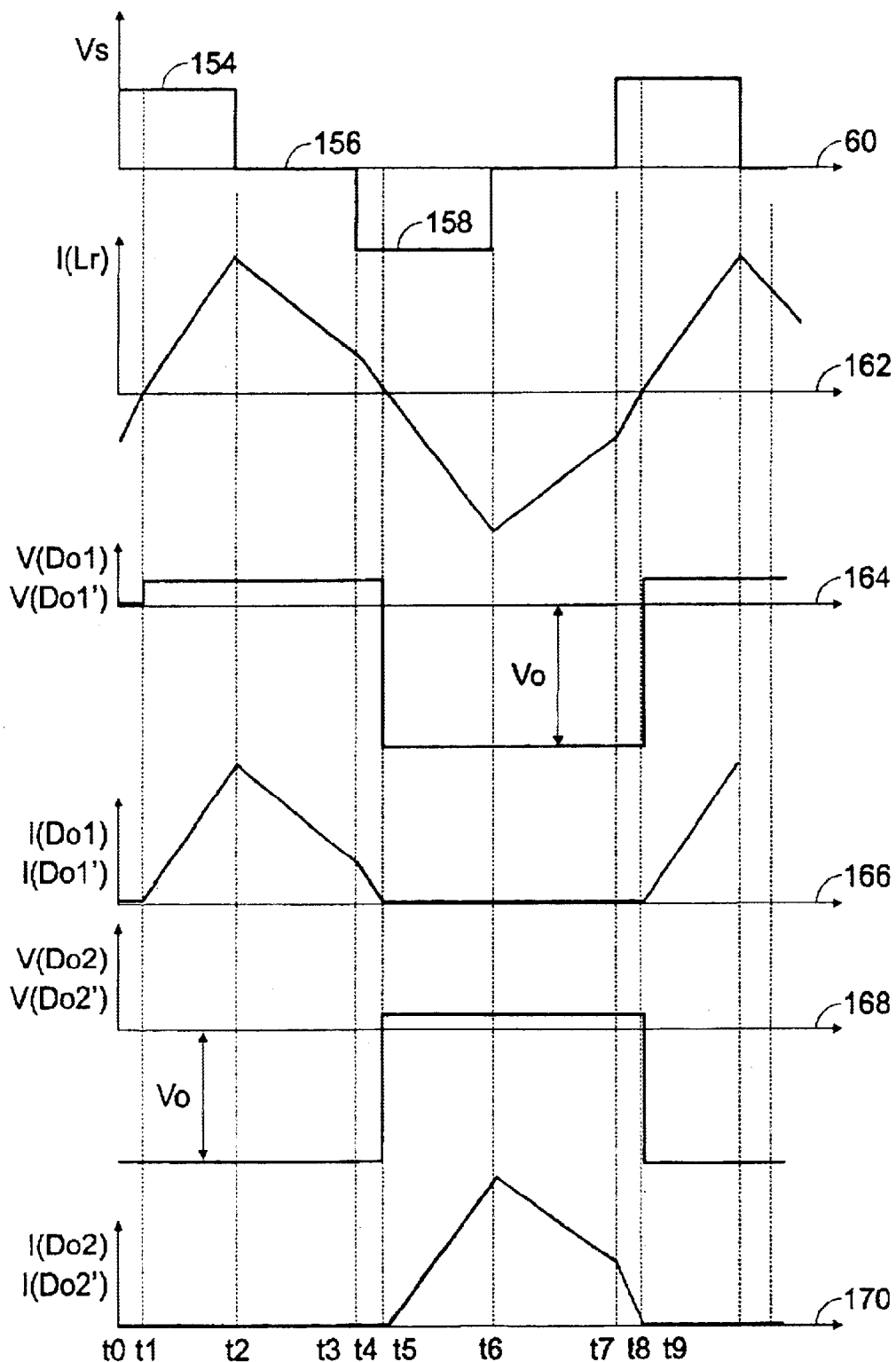

SOFT TRANSITION CONVERTER

BACKGROUND OF INVENTION

1. Field of the Invention

This invention relates to DC-to-DC converters, DC-to-AC inverters and AC-to-DC converters. The major characteristic of this power conversion technique is that primary switching elements switches at zero voltage and the secondary rectifiers means have negligible reverse recovery losses.

2. Description of the Prior Art

There is a continuing industry demand for increasing power density, which means more power transferred in a given volume. A method for increasing the power transfer through the converter is to increase the switching frequency in order to minimize the size of magnetic and the capacitors. Using prior art topologies such as forward or flyback, which employ "hard" switching techniques makes high frequency operation less efficient. The switching losses associated with switching elements, which turn on when there is a voltage across them, are proportional with the switching frequency. An increase in switching frequency leads to an increase in switching losses and an increase in the level of electromagnetic interference (EMI).

In order to overcome limitations in switching speeds, the prior art has devised a new family of soft transition. The U.S. Pat. Nos. 5,132,889, 5,126,931, 5,231,563, 5,434,768 present several methods of accomplishing zero voltage switching across the primary switches.

Another power loss mechanism is due to the reverse recovery in the output rectifiers. During switching when a negative polarity voltage is applied to a rectifier in conduction the current through the rectifier will continue to conduct until all the carriers in the rectifier's junctions are depleted. During this period of time the current polarity will reverse, the current flowing from the cathode to the anode, while the voltage across the diode is still positive from the anode to the cathode. The current flowing in reverse through the diode will reach a peak value referred in literature as Irrm. Further on, while the rectifiers' junction is depleting the carriers, the rectifier becomes a high impedance device. The current through the rectifier will decrease rapidly from Irrm level to zero. During the same time the negative voltage across the rectifier will build up to high levels.

During the period of time when there is a negative voltage across the diode and negative current is flowing through it, there will be power dissipation in the device. This kind of loss is referred in the literature as reverse recovery losses. The reverse recovery loss is proportional with the reverse recovery current Irrm, the negative voltage across the rectifier and the frequency.

The reverse recovery current Irrm, which is a key component in reverse recovery loss, is a function of this type of device, the temperature and the current slope at turn off. The reverse recovery characteristics are getting worse for higher voltage rectifiers. As a result the reverse recovery loss becomes a significant loss mechanism for higher output voltage applications. The reverse recovery current Irrm is direct dependent of the current slope at turn off. A soft slope reduces the reverse recovery current and as a consequence reduces the reverse recovery loss. To accomplish a very soft slope current at turn off an inductive element has to be in series with the rectifier. The inductor element will prevent a fast current variation dI/dt. The presence of an inductive element in series with the rectifier will increase the negative voltage across the rectifier at turn off. The reverse voltage across the rectifier can reach very high levels and can exceed the voltage break down of the device, leading to failure.

RC snubbers or complicated lossless snubers can be added across the rectifier to reduce the reverse recovery loss and the voltage stress on the devices. This leads to complex circuits and which negatively affects the efficiency and the reliability. As a result of these limitations the high voltage converters have to operate at lower frequency in order to reduce the power dissipation associated with reverse recovery.

What is needed is a converter topology which can operate at constant frequency with zero voltage switching on the primary switches and soft commutation on the output rectifiers, wherein low current slope through the rectifiers at turn off is associated with low negative voltage across the rectifiers. The lowest voltage across the output rectifiers in a DC-DC converter is the output voltage. As a result our goal is to reduce the negative voltage across the output rectifier to the level of the output voltage.

BRIEF SUMMARY OF THE INVENTION

The invention applies to topologies in which the voltage in the secondary of the transformer has three states. One state wherein the voltage in the secondary is a positive voltage source, another stage wherein the voltage in the secondary of the transformer is zero with a very low internal impedance and the third stage wherein the voltage in the secondary of the transformer is a negative voltage source. To provide such secondary signal we have identified three topological structures. One is the full bridge phase shifted topology. The second topology is a half bridge utilizing and additional bydirectional switch, depicted in FIG. 9A. The third topology is two transistors forward phase shifted, depicted in FIG. 14A.

All these topologies operate in a similar manner. An input voltage source is applied to the primary of a transformer through controlled switching elements. The primary winding of the transformer has two terminations. For simplicity we are going to refer to one end of the primary winding of the transformer as a dotted end. The secondary winding of the transformer has also two terminations. When a voltage is applied to the primary winding of the transformer with the positive polarity at the dotted end, a voltage will be induced in the secondary. The termination of the secondary winding where the voltage induced has a positive polarity is referred as a dotted end of the secondary winding.

The input voltage source is applied to the primary winding of the transformer through two controlled switching elements. A control-switching element is an electronic switch, which can be controlled by a control signal to exhibit low impedance when the switching element is turned ON or large impedance when the switching element is turned OFF. The input voltage source is applied to the primary winding through two controlled switching devices, which connects the termination of the transformer to the termination of the input voltage source selectively. The dotted end of the primary winding of the transformer can be connected to the positive end of the input voltage source and the other end of the primary winding of the transformer is connected to the negative end of the input voltage source. This operation will be further referred to as positive voltage across the primary winding.

The controlled switching elements can also connect the dotted end of the primary winding of the transformer to the negative end of the input voltage source and the other end of the primary winding of the transformer is connected to the positive end of the input voltage source. This operation will be further referred as negative voltage across the primary winding.

The control switching elements can also short out the primary winding of the transformer by applying low impedance across the winding. This operation will be further referring to as the dead time.

The controlled switching elements can be controlled in a such way to apply sequentially a positive voltage across the primary winding for given period of time, referred as positive ON time, short the primary winding for a period of time, referred as dead time, apply a negative voltage across the primary winding for a given period of time, referred as negative ON time, equal as duration with the positive ON time. If the summation of positive ON time, dead time and negative ON time is constant, the mode of operation is referred as constant frequency operation.

The power converter can also operate in frequency modulation mode, wherein the summation of positive ON time, dead time and negative ON time is not constant. We introduce the term of duty cycle, which is defined as the ratio between the summation of positive and negative ON time and the summation of the positive ON time, twice the dead time and negative ON time. By varying the duty cycle the power transferred through the transformer can be controlled. The duty cycle can be varied by varying the duration of the positive and negative ON time, for the constant frequency operation. For variable frequency operation the duty cycle control can be made by maintaining the negative and positive ON time constant and varying the dead time, or by varying the positive and negative ON time and maintain the dead time constant or by varying the positive and negative ON time and the dead time in the same time. Important is to have the positive ON time equal to the negative ON time. Another important element of this technology is the low bydirectional impedance across the secondary winding of the transformer, wherein the secondary current can flow freely in both directions.

One key element in this invention is an additional inductor element in series with the secondary winding, labeled soft commutation inductor. The inductor can be also located in the primary section in series with the primary winding of the transformer. The soft commutation inductive element can be also split, one section located in the primary, in series with the primary winding and an another section in the secondary in series with the secondary winding. In the case when the soft commutation inductor is located in the secondary, there is a bydirectional rectification means connected in series with it and the secondary winding. A bridge of rectifiers can form the bydirectional rectification means. Across the capacitor element is connected the load. The bridge of rectifiers has a first input terminal, a second input terminal, a first output terminal, and a second output terminal. The first rectifier is connected between the first input terminal and the first output terminal with the cathode to the first output terminal, the second rectifier is connected between the second input terminal and the first output terminal, with the cathode to the first output terminal. The third rectifier is connected between the second input terminal and the second output terminal with the cathode to the second input terminal, the fourth rectifier is connected between the first input terminal and the second output terminal with the cathode to the first input terminal. The AC voltage source in series with said inductive element is connected between the first input terminal and the second input terminal. The output capacitor is in parallel with the load is connected between the first output terminal and the second output terminal.

The bydirectional rectification means can also be constructed using two rectifiers and two capacitors. The bridge of rectifiers means and capacitors having a first input terminal a second input terminal a first output terminal and a second output terminal. The first rectifier is connected between the first input terminal and the first output terminal with the cathode to the first output terminal, the second rectifier is connected between the first input terminal and the second output terminal, with the cathode to the first input terminal. The first capacitor is connected in between the first output terminal and the second input terminal, and the second capacitor is connected between the second input terminal and the second output terminal. The said AC voltage source is in series with the soft commutation inductive element and connected between the first input terminal and the second input terminal. The load is connected between the first output terminal to the second output terminal.

During the positive and negative ON time the power is transferred from the primary to the secondary via the transformer, the soft commutation inductor, and the bydirectional rectifier means to the load. In the same time energy is stored in the soft commutation inductor. During the dead time, the energy stored in the soft commutation inductor is further transferred to the load. There are two modes of operation. One mode of operation referred as discontinuous conduction mode, the entire energy stored in the soft commutation inductor is transferred to the load prior the change of the voltage polarity on the transformer. The second mode of operation referred as continuous mode, there is still energy left in the soft commutation inductor prior the reversal of the voltage polarity in the transformer. The discontinuous mode of operation has the advantage of transferring the energy from the primary to the secondary unidirectional at each cycle. The continuous mode of operation will transfer the energy left in the soft commutation diode back to the primary before the next energy transfer from primary to the secondary starts.

A critical conduction mode of operation can be implemented wherein the reversal of the voltage polarity in the transformer is accomplished just after the entire energy in the soft commutation inductor is transferred to the secondary. This leads to a modulation in frequency, wherein the frequency will increase at light loads, and decrease at heavy loads. A mix mode of operation can be also implemented wherein some high frequency boundary or low frequency boundaries or both are set. There are several major advantages of this topology.

One of the major advantages is the fact that the voltage across the rectifiers is clamped to the output voltage. There is not ringing or spike across the rectifiers which exceed the output voltage. The voltage across the rectifiers for a given output voltage is the lowest theoretical possible. In most of the topologies operating over a range of input and output voltages the voltage across the rectifiers can be several times larger that the output voltage. For a single ended forward converter the output voltage is $Vr=(Vin_{Max}/Vin_{Min})*Vo/D_{Max}$ wherein $Vin_{Max}$ & $Vin_{Min}$ is the maximum and minimum input voltage and $D_{Max}$ is the maximum duty cycle, and Vo is the output voltage. For an input voltage range of 2:1 and 50% maximum duty cycle, the reverse voltage across the rectifier is 4*Vo. In conclusion in these topologies we achieve the lowest voltage across the rectifiers for a given output voltage.

Another major advantage of this topology is the fact that the current slope through the rectifier at turn off is controlled by the soft commutation inductor. As a result there is a controlled dI/dt. A soft current through the rectifier at turn OFF reduces considerably the reverse recovery current. The clamped voltage across the output rectifiers in association with the soft current slope at turn OFF leads to reduced reverse recovery losses. If the circuits operate in continuous mode the reverse recovery losses are reduced, and if we operate in discontinuous conduction mode the reverse recovery losses are actually eliminate. This is due to the fact that the current through the rectifiers reaches zero prior the reverse voltage is applied to them.

The invention can be better visualized by turning to the following drawings.

BRIEF DESCRIPTION OF THE DRAWINGS

FIG. 1B is a timing diagram of the circuit of FIG. 1A.

FIG. 2 is a schematic diagram of an AC-DC converter wherein prior art technique is illustrated.

FIG. 3A is a schematic diagram of a DC-DC Converter wherein another prior art technique is illustrated.

FIG. 3B is a timing diagram of the circuit of FIG. 3A.

FIG. 4A is a schematic diagram of an AC-DC Converter using an embodiment of this invention.

FIG. 6B is a timing diagram of the circuit of FIG. 6A.

DETAILED DESCRIPTION OF THE PREFERRED EMBODIMENTS

For the AC-DC and DC-DC converters for high voltage application wherein the use of Schottky rectifiers is not possible due to high voltage across the rectifiers, one of the major obstacles is the reverse recovery loss of the rectifiers. The reverse recovery losses are proportional with the current slope through rectifier at turn OFF, the reverse voltage across the rectifier after the rectifier exhibits high impedance, the temperature, frequency of operation and the device characteristics. Additional snubber circuits are often used to reduce the voltage stress on the rectifiers during switching. The frequency of operation has to be also reduced which leads to poor volumetric efficiency of the converters. In FIG. 2 are presented a prior art an AC-DC converter. An AC source drives the primary of the transformer T6, 950. There is inherent leakage inductance in the transformer, which acts as a current source during commutation of the rectifiers 406 and 408. In the right side of the rectifier there is another current source formed by 410. During switching transitions there are two unmatched current sources on both ends of the rectifiers. This leads to high voltage spikes across the rectifiers 406 and 498. Additional RC snubbers are necessary to maintain the voltage across the rectifiers below the breakdown voltage. This leads to higher power dissipation and high EMI.

In FIG. 3A there is presented another prior art topology used for high voltage applications wherein an additional Lv, 12, is added in the primary of the transformer Tr1. Additional clamping diodes D5 and D6 are also inserted. The reverse recovery losses in the secondary rectifiers are reduced due to controlled current slope during switching. The limitation of the current slope is due to Lv. The presence of two-unmatched current source such as the Lv and 30 leads also to voltage spikes across the secondary rectifiers 22, 28, 24 and 26. This requires snubbers circuits across the output rectifiers, which will reduce the efficiency of the converter.

This invention proposes several circuits wherein there is not need for snubber circuits across the secondary rectifiers, and the reverse recovery losses are minimized and under certain conditions eliminated. The maximum voltage across the rectifiers in this invention is clamped to the output voltage. This will allow a very efficient operation at high frequency in high power and high voltage applications leading to an increase of the power density of the converter.

Figure 4B:
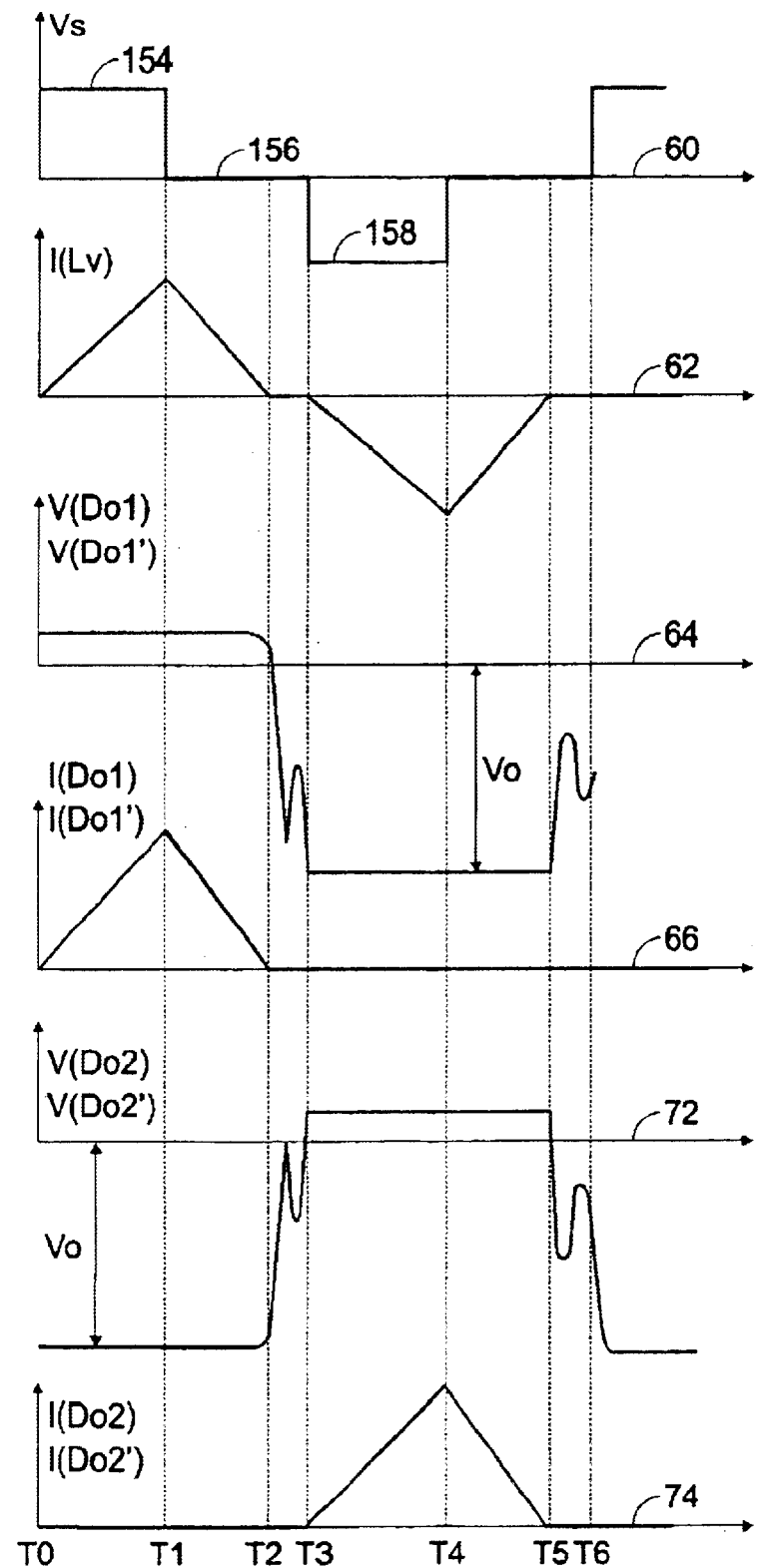
FIG. 4B is a timing diagram of the circuit of FIG. 4A.

In FIG. 4A is depicted an AC voltage source Vs, 46. The voltage signal produced by 46 is presented on time diagram 60 in FIG. 4B. From To to T1 the voltage source 46 provides a positive voltage, 154. The duration of this signal is referred as Ton. The Ton is the difference between T1 and To. After T1 the voltage source 46, provides a zero amplitude voltage signal 156, exhibiting in the same time very low internal impedance. During the time interval T1–T2, the voltage source 46 acts as a sort circuit. The current can flow bydirectional through 46, without developing a significant voltage drop. After T3, the voltage source 46, provides a voltage 158 of opposite polarity to 154 and the same amplitude. The time interval T3 to T4 when 46, provides 158, is equal to the time interval To to T1. The product of the time interval (T1–To) and the voltage amplitude 154 is equal to the product of the time (T4–T3) and the voltage amplitude of 158. After T4, the voltage source 46, is equivalent again to a short circuit providing a zero amplitude voltage. This state will apply for the time interval between T4 to T6. The time interval T1 to T3 and the time interval T4 to T6 are preferred to be equal, though it is not necessary. The embodiment of this invention will also apply if T3–T1 is not identical to T6–T4.

Figure 8A:
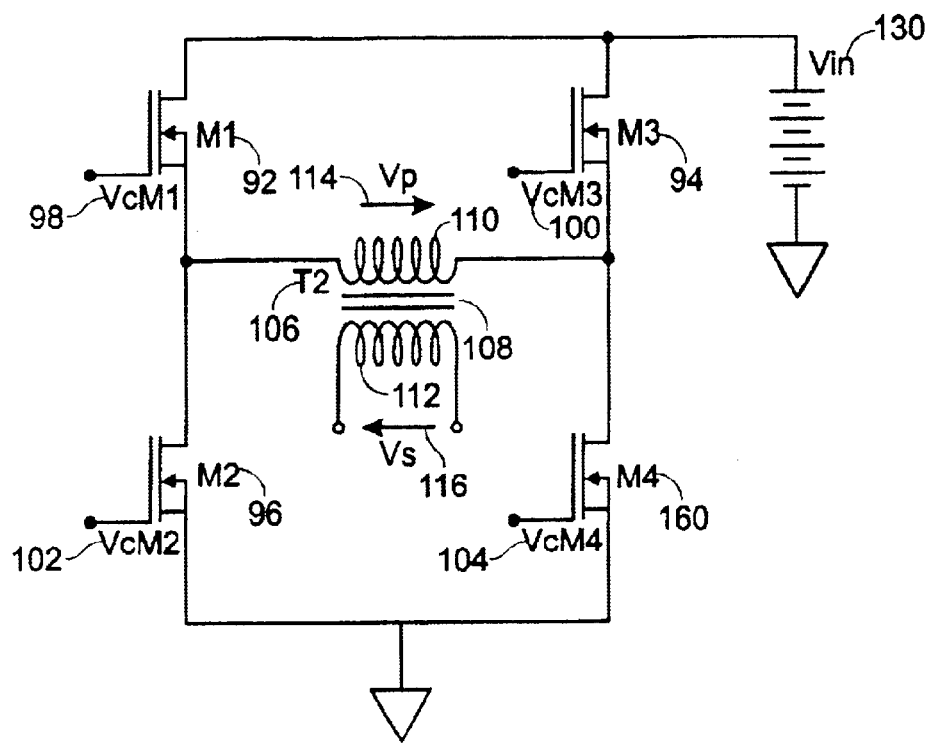
FIG. 8A is a schematic diagram of a DC-AC Converter, utilizing a phase shift bridge topology suitable with the AC-DC converters depicted in several embodiments of the invention.
Figure 9A:
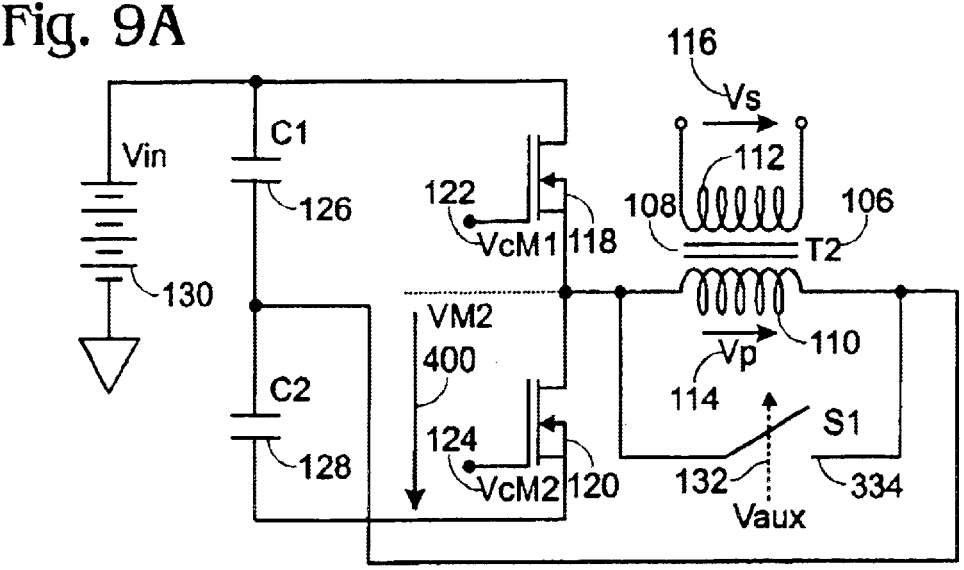
FIG. 9A is a schematic diagram of an DC-AC Converter, utilizing a half bridge topology employing an additional bydirectional switch, topology suitable with the AC-DC converters depicted in several embodiments of the invention.
Figure 14A:
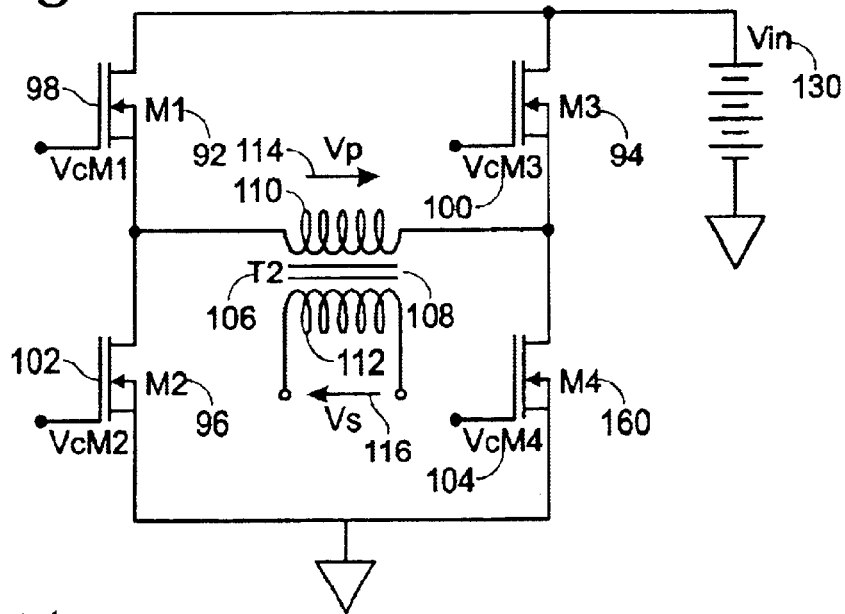
FIG. 14A is a schematic diagram of an DC-DC Converter using the embodiment presented in FIG. 4A, The AC signal across the primary winding of the transformer is produced by two phase shifted two transistor forward topologies. This structure being another embodiment of the invention.

This type of voltage source can be produced by a transformer and several controlled switchers as is depicted in FIGS. 8A, 9A and 14A. The method of control pictured in 8A is well known in the prior art.

As is depicted in FIG. 4A in addition to the voltage source 46, there is an inductive element Lr, 48 and a bridge of rectifiers, 900, formed by rectifiers 50, 54, 52, and 56. The inductive element Lr is referred in this application as the soft commutation inductor element. The voltage source 46 is connected in series with inductor 48, and applied across the rectifier bridge 900 with one termination to the cathode of 56 and the anode of 50. The second termination goes to the cathode of 52 and the anode of 54. A capacitor 58 is connected across the other two termination of the bridge, respectively between the anodes of 56 and 52 and the cathodes of 50 and 54. A load 902 is connected across the capacitor 58.

During To to T1 when 46, produces a positive voltage 154 at the end connected to Lr, the current fill flow through Lr, rectifier 50, rectifier 52 the capacitor 58 and the load 902. It is assumed that the voltage across 58 exhibits low voltage ripple much lower than the voltage amplitude produced by 46. With this assumption the current through Lr will build up linearly as pictured in 62 of FIG. 4B, from zero to a peak value at T1. During this period of time the energy provided by 46, will be transferred to 902, and a part of energy will remain stored in Lr. During the time interval between T1 to T2 when the voltage source Vs is equivalent to a short circuit, the current through Lr will continue to flow until the entire energy stored in Lr will be transferred to the load 902. This will occur at T2, when the current through Lr will reach zero. During the interval T2 to T3 there is not energy transferred to the load. Do1 and Do1' ceases to conduct after the current through Lr reaches zero. A voltage ringing may occur across the rectifiers of bridge 900, as a result of the resonant circuit formed by Lr and the parasitic capacitance of the rectifiers, 50, 52, 54 and 56. The energy contained in this resonant circuit is very small, if the parasitic capacitance of the rectifiers is small. A saturable inductor element is in series with Lr may damp this oscillation if its energy content is too high. In the critical conduction mode of operation wherein the voltage produced by Vs will change polarity after the current through Lr reaches zero this ringing will not exist. The time interval between T2 and T3 can be controlled in such way that the polarity change of the voltage produced by 46 will occur after the ringing across the rectifiers forces the second set the rectifiers, which will conduct in the next cycle, in this case 56 and 54, in conduction. In this mode of operation there will be zero voltage switching for the rectifiers. The disadvantage of this mode of operation is the frequency modulation for load and line change. The advantage of this mode of operation is that we create ideal switching condition for the rectifiers. A combination of critical conduction through Lr and fix operating frequency for light load operation it may give the optimum operating mode. At the moment T3, the voltage source 46, changes its polarity and the current fill start flowing linearly through Lr in the opposite direction. At the moment T4, when the voltage produced by 46, becomes zero, the current through Lr reaches its peak. Further between T4 to T5 the entire energy stored in Lr will be transferred to the load 902. This will occur at the moment T5 when the current through Lr reaches zero. In between T5 and T6 we have the same mode of operation as described between T2 and T3.

The advantage of this mode of energy transfer from the source 46, to the load 902 is the fact that the voltage across all the rectifiers contained in the bridge 900 is clamped to the voltage across Co which is also the output voltage of the converter and the fact that the current through the rectifiers at turn OFF is zero. The voltage across all the rectifiers reverses only after the current reaches zero. This mode of operations eliminates reverse recovery losses, which is a significant advantage for high output voltage application. If the mode of operation is critical conduction through Lr, and the voltage commutation of 46, occurs after the current through Lr reaches zero and delayed by a time interval until the voltage across the rectifiers which will conduct at next cycle to reach zero, or its lowest level. The control of the voltage reversal of the voltage source 46 can be done through anagogic circuits which sense the current through Lr and the voltage across the rectifiers, or can be done with microcontroller using digital signal processing.

Figure 6A:
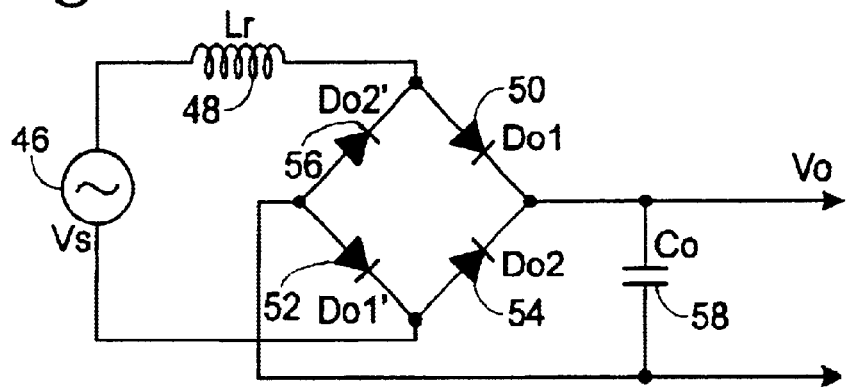
FIG. 6A is a schematic diagram of an AC-DC Converter using an embodiment of this invention depicted in FIG. 4A, operating in continuous mode.
Figure 5B:
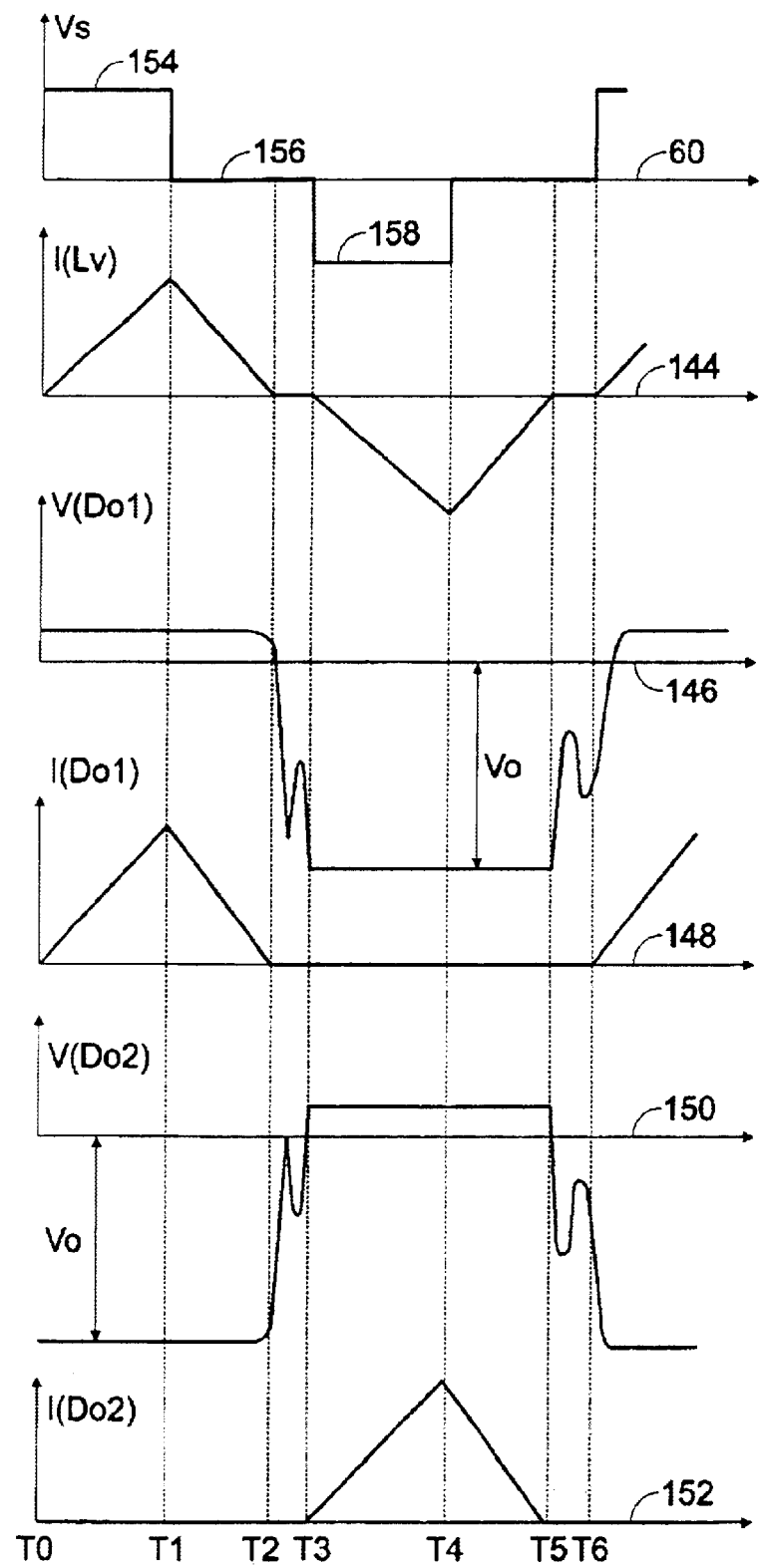
FIG. 5B is a timing diagram of the circuit of FIG. 5A.

In FIG. 6A there is presented the same configuration as FIG. 4A. The difference is the mode of operation, which is depicted in FIG. 6B. After a positive voltage is applied by 46, and the current is built up through Lr, until the voltage source 46, becomes a short circuit. The current will continue to flow through Lr transferring its stored energy to the load. When the voltage produced by Vs changes its polarity there is current present through the Lr. The voltage across Lr is the sum between the output voltage 904 and the voltage across Vs, 158. The current through Lr will decrease at a higher rate and will reach zero at T8. Between T3 and T8 the current will force the rectifier 50 and 52 to continue to conduct. The reverse of conduction will occur at T8, when the rectifier 56 and 54 will be forced into conduction. In this mode of operation there are reverse recovery losses due to the conduction of the rectifiers when the reverse voltage is applied to them. The reverse recovery losses are not high due to the fact that the rate of current change through rectifiers at turn off is limited by Lr. In addition to that the reverse voltage across the rectifiers is clamped to the output voltage 904. During the time interval T3 and T8 and T6 to T9, the energy is transferred from the Lr to the voltage source. In conclusion during T7 to T1 and respectively T8 and T4 the energy is transferred from the primary to the load and to the Lr. During the time interval To to T7 and respectively T3 and T8, the energy is transferred from Lr to the source. This kind of operation is less efficient that the one presented in FIG. 4A. In most of applications this mode of operation referred as continuous conduction mode can occur during the transient situations. The current through the Lr is depicted in 162. The voltage across the rectifiers is depicted in 164 and 168. The current through 50 and 52 is depicted in 166. In 170 is depicted the current through 56 and 54.

It is very important to underline the fact that the key advantage of this invention is the energy transferred from primary to secondary is done in one direction only, if the operation occurs in discontinuous mode. The voltage source Vs would not exhibit short circuit characteristics during T1 to T3 and T4 to T5, the energy will be also transferred from the load to the primary. This limits the numbers of topologies, which can be used in the primary side, capable to provide the right characteristics for Vs.

Figure 5A:
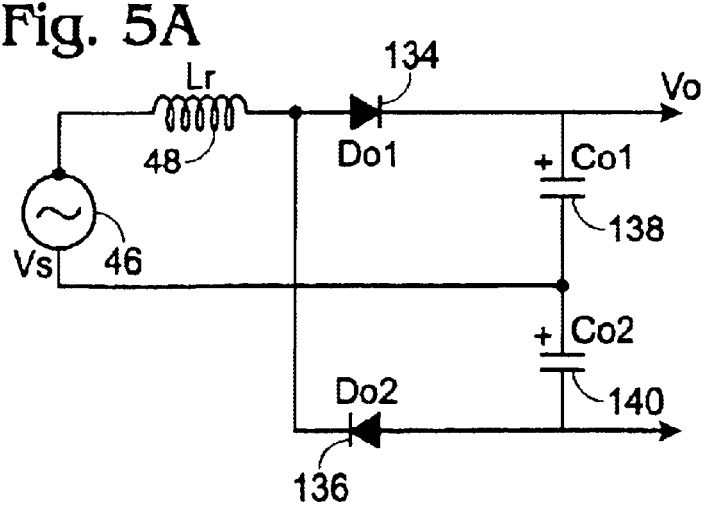
FIG. 5A is a schematic diagram of an AC-DC Converter using another embodiment of this invention.

In the circuit presented in FIGS. 5A and 6A the energy transferred from the Vs to the load is function of the voltage across Vs, the output voltage 904 and the inductor Lr. The circuit 7A presents a method of power transferred wherein the amount of energy transfer for a given Vs, Lr and Vo can be further increased and modulated by the additional bydirectional switch S2. The additional switch S2 does not have to be bydirectional.

Figure 7A:
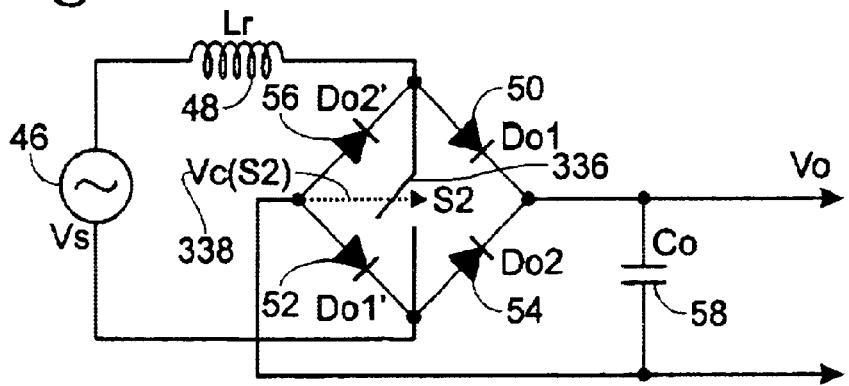
FIG. 7A is a schematic diagram of an AC-DC Converter using another embodiment of this invention.
Figure 7B:
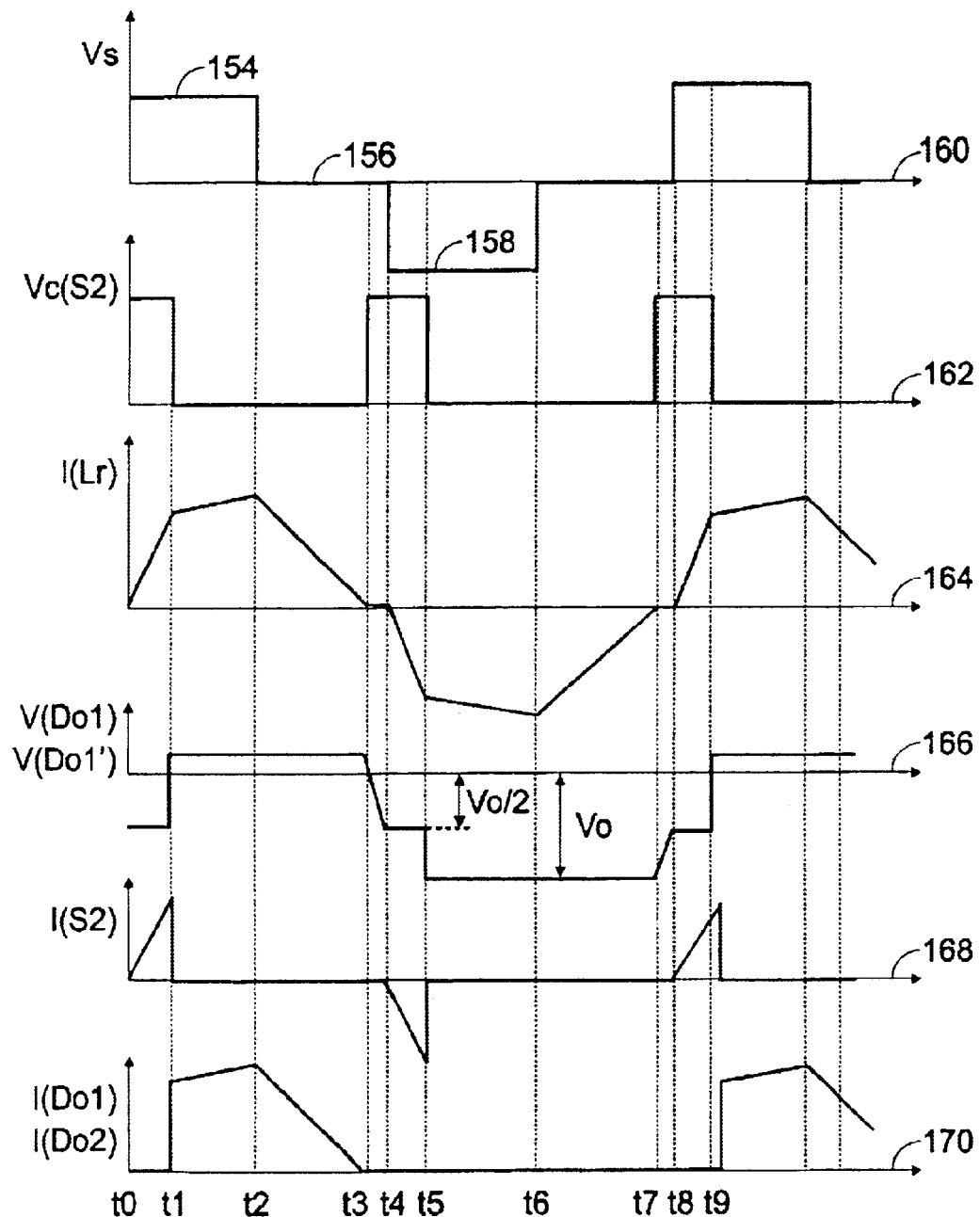
FIG. 7B is a timing diagram of the circuit of FIG. 7A.

The bydirectional switch will maintain the symmetry of the energy transfer for the positive cycle 154 and negative cycle 158. A unidirectional switch will modulate the power only for positive or negative cycle. The timing diagram on FIG. 7B is referring to a bydirectional switch. The control signal for the switch S2, 336, is synchronized with the voltage source Vs. The switch is turned ON when a positive polarity voltage 154, and a negative polarity voltage 158 is ramping up from Vs. During the time interval from To to T10, a positive voltage 154 is provided by Vs, and the switch 336 is ON. As a result the current will flow through Lr with a slope determined by the amplitude of 154 and the value of Lr. The value of the output voltage 904 does not play any role. The current slope in between To and T10 is high and more energy is stored to Lr during this interval. When the switch S2 is turned OFF at the moment T10 the current which flows through Lr will turn ON the rectifiers 50 and 52, transferring the energy to the load 902. The current continues to build up through Lr at a smaller rate imposed by the difference between the amplitude of 154 and the output voltage. At the moment T1 the current through Lr reaches its peak. From T1 to T2 all the energy contained in Lr will be transferred to the output if the unit operates in discontinuous mode, as is depicted in FIG. 7B. The unit can also operate in continuous mode, wherein the current will not reach zero before the voltage Vs will reverse its polarity. When the voltage Vs changes its polarity at T3, the switch S2 will be also turned on and the current will build up through Lr with the same slope as between To to T10, but of opposite polarity. The major advantage of this embodiment over the embodiment presented in FIGS. 4A and 6A, is the fact that the energy transfer from Vs to Lr is independent of Vo during the To to T10, respectively T3 to T12 period. The energy transferred during a given time is higher without increasing the amplitude of 154. The output power can be also modulated not only by the ratio of the ON time which is the summation of the (T1–To) and (T4–T3) and the period of the signal depicted in 160. The output power can be further modulated by the ON time of S2.

Figure 10A:
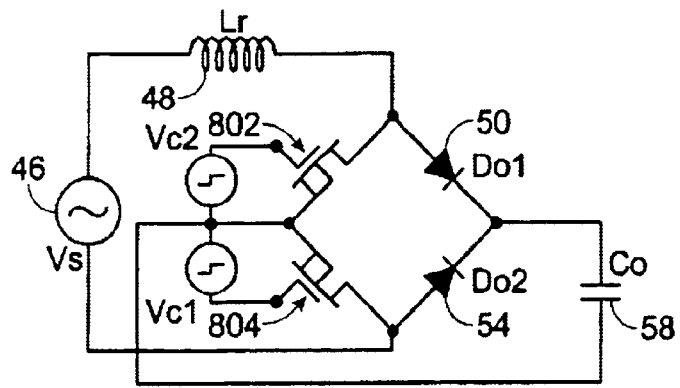
FIG. 10A is a schematic diagram of an AC-DC Converter depicted in FIG. 4A wherein two of the rectifiers are replaced by synchronous rectifiers.
Figure 10B:
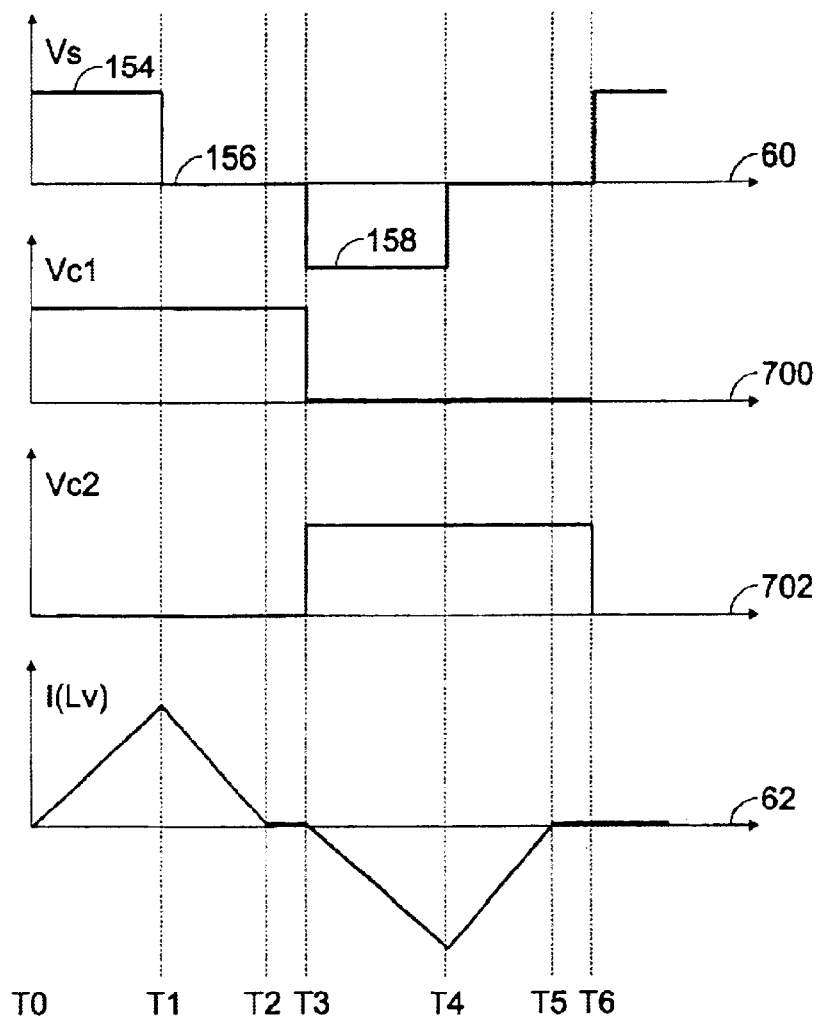
FIG. 10B is a timing diagram of the circuit of FIG. 10A.

FIG. 10A is an extension of the embodiment depicted in FIG. 4A wherein the rectifiers 56 and 52 are replaced by the controlled synchronized rectifiers M10, 802, and M11, 804. These synchronous rectifiers are controlled by the Vc2 and Vc1 depicted in 700 and 702. The use of synchronous rectifiers may have the advantage of lower voltage drop, which translates in a higher efficiency. Between To to T1 when a positive voltage 154 is applied to Lr, the current will flow through Do1 and M11. The control signal 908 turns ON the M11 at To. The control signal 908 has to keep M11, turned ON until T2. The control signal Vc1 can be maintain high even after T2 without impacting the mode of operation. This is a major advantage for using synchronous rectifiers because the timing at turn OFF is not very critical. Important is to turn OFF, Vc1 prior the T3.

Figure 11A:
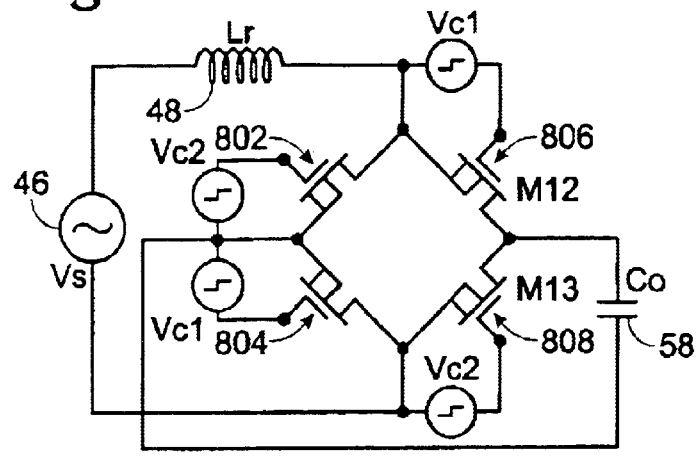
FIG. 11A is a schematic diagram of an AC-DC Converter depicted in FIG. 4A wherein all of the rectifiers are replaced by synchronous rectifiers.
Figure 11B:
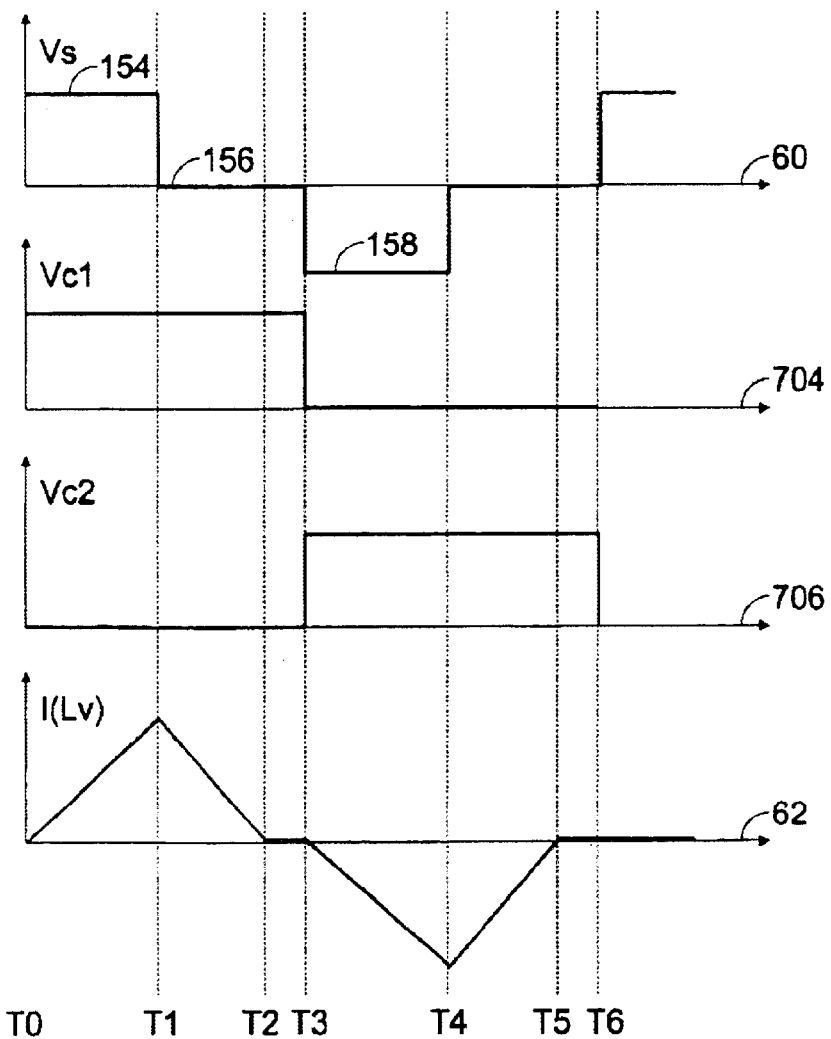
FIG. 11B is a timing diagram of the circuit of FIG. 11A.

Another embodiment of this invention is presented in FIG. 11A. The bridge 900 is formed by the synchronous rectifiers controlled by controlled signals Vc1 and Vc2. The timing diagram for Vc1 and Vc2 are depicted in FIG. 11B in 704 and 706. The mode of operation for the converter depicted in FIG. 11A is the same as the one depicted in FIG. 4A for discontinuous and critical conduction mode and the one depicted on 6A for the continuous conduction mode.

Another embodiment of the invention is presented in FIG. 5A. The circuit formed by the voltage source Vs and the Lr in series is connected to a bridge formed by two rectifiers 134 and 136 and two capacitors 138 and 140. The output voltage 904 is the voltage across the two capacitors 138 and 140. The output voltage is further applied to a load. In this there are used only two rectifiers. Between To and T1 the voltage source Vs provides a positive polarity voltage 154 at the end connected to Lr. The current will flow through Lr, Do1 and Co1. At T1 the current through Lr reaches its peak. Between T1 to T3 the source 46 becomes a short circuit 156. The current continues to flow through Lr until reaches zero at T2. At that time all the energy stored in Lr is transferred to the Co1 and Load, via Vo. At T3 the voltage polarity produced by 46 reverses. The current will flow from the voltage source Vs through Co2, Do2 and through Lr in an opposite direction to the flow in the previous cycle. The load is applied across the series combination formed by Co1 and Co2. This circuit maintains the same advantages of the circuit depicted in FIG. 4A. The voltage across each rectifier is clamped to the output voltage. The current through rectifiers reaches zero prior to the application of a reverse voltage across them. As a result the reverse recovery losses are eliminated. If the converter operates in critical conduction mode, wherein the voltage polarity of 46 changes after the current through 48 reaches zero, with a delay necessary for the voltage across the rectifier which will conduct at next cycle reaches zero or close to zero, we can reach zero voltage or near zero voltage commutation for the rectifiers.

Figure 12A:
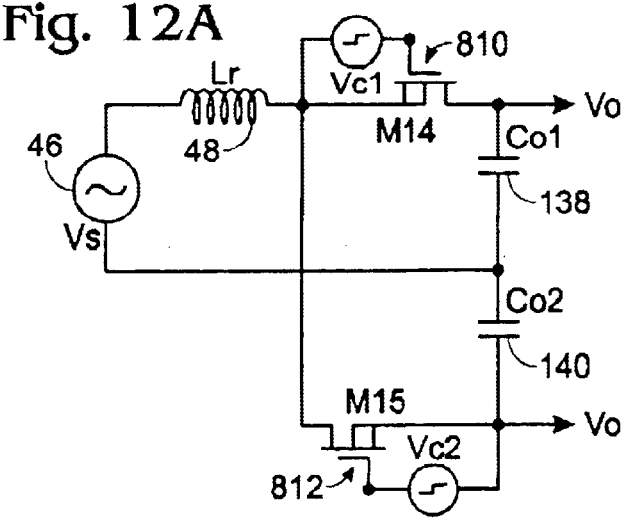
FIG. 12A is a schematic diagram of an AC-DC Converter depicted in FIG. 5A wherein all of the rectifiers are replaced by synchronous rectifiers.
Figure 12B:
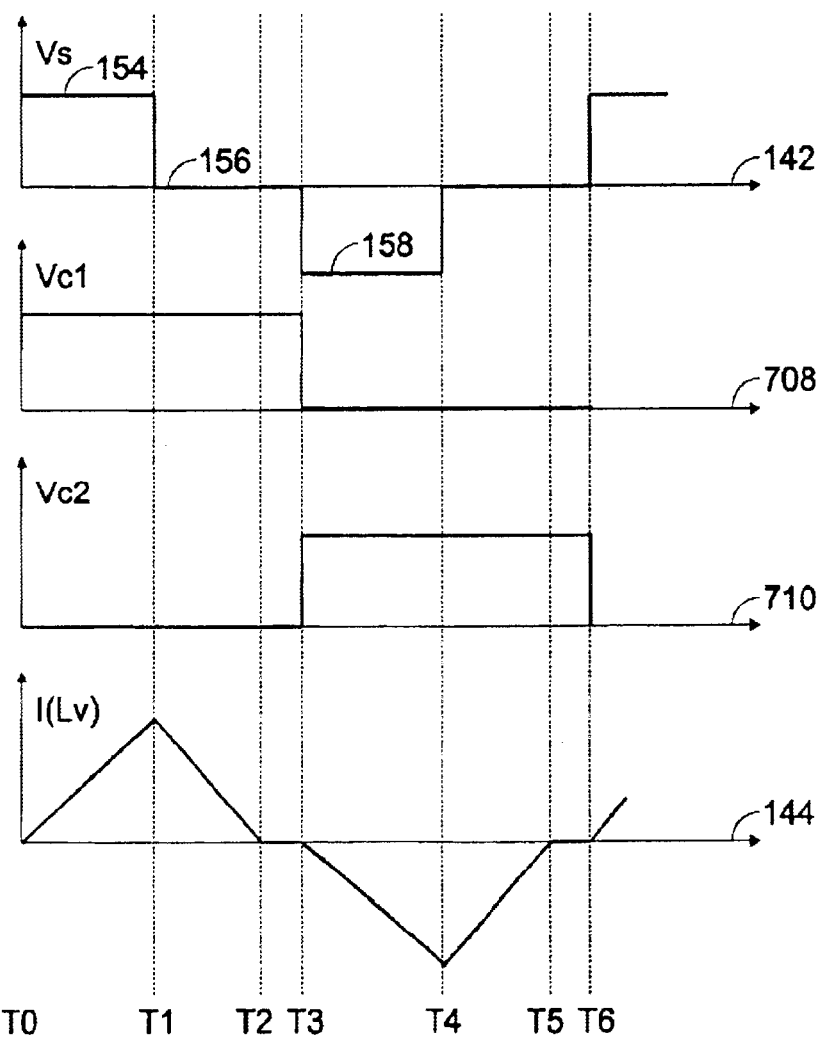
FIG. 12B is a timing diagram of the circuit of FIG. 12A.

The circuit depicted in FIG. 5A can also operate in continuous conduction mode as the circuit depicted in FIG. 6A. In FIG. 12A the rectifiers 134 and 136 are replaced by two controlled synchronous rectifiers 810 and 812. The control signals Vc1 and Vc2 are depicted in FIG. 12B in 708 and 710.

Figure 8B:
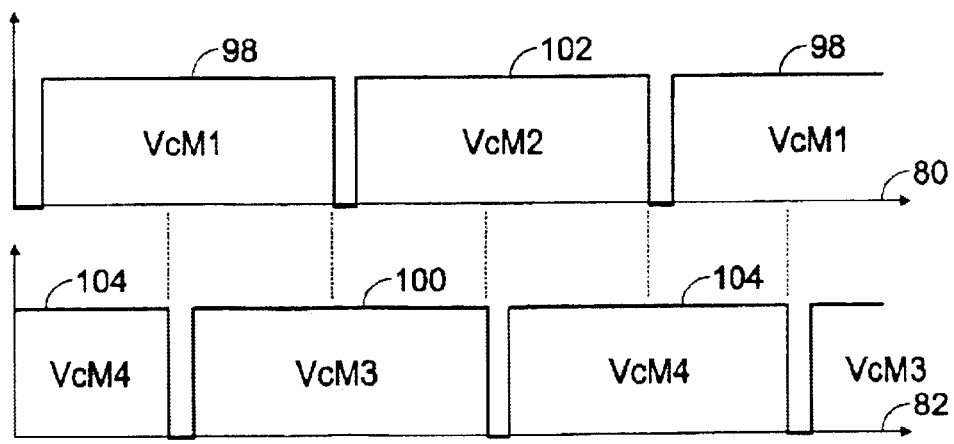
FIG. 8B is a timing diagram of the circuit of FIG. 8A.

In order to produce the Vs in the secondary of a transformer there are presented three circuits, which are suitable to produce such a source. One of these circuits is presented in FIG. 8A. The timing diagram associated with this circuit is presented in FIG. 8B. This circuit is familiar to those skilled in the art. It is known as phase shift full bridge. It is formed by two complementary half bridges, one formed by M1 and M2 and another one formed by M3 and M4. The control signals for M1 and M4 are presented in 80. The controlled signals for M3 and M4 are presented in 82. During the conduction of M1 and M4 the input voltage is applied to the primary winding 110 of the transformer T2. The voltage induced in the secondary winding 112 is positive in reference to the arrow 116. In the secondary winding 112 there will be a voltage referred previously as 154. When the M4 turns OFF the current will continue to flow through the primary winding 110, and further through the body diode of M3, creating zero voltage switching condition for M3 which is turned on at zero voltage. During the time when M1 and M3 conduct, the primary winding of 106 is shorted. In the secondary, the Vs will be zero and a short-circuit characteristics.

This is equivalent to what previously was referred as 156. At the moment when M1 turns OFF the current will continue to flow through 110 and the drain to source capacitance of M2 creating zero voltage or near zero voltage conditions for M2. The voltage applied to primary winding 110 will change the polarity applying a negative voltage in reference to the arrow 112. This is equivalent to what previously was referred as 158. When M3 is turned OFF the current continue to flow through 110 discharging the drain to source capacitance of M4 to zero or near zero, creating zero or near zero voltage switching conditions for M4. When M2 and M4 conduct the primary winding 110 is shorted and in the secondary the state of Vs is as short circuit 156.

The circuit presented in FIG. 8A, which is known as phase shifted full bridge converter can generate in the secondary of the transformer the voltage source used in describing our embodiments. What differentiate the circuit of FIG. 8A from other circuits which can generate a voltage source, is the short circuit behavior 156 during the time when the voltage in secondary is zero.

The combinations of the circuits presented in FIGS. 4A, 6A, 7A 5A, 10A, 11A and 12A with the full bridge phase shifted topology depicted in 8A, has another advantage. The slow rising the current through Lr in the secondary will allow the full swing towards zero voltage across all the switchers in the primary. A fast current ramp in the secondary winding which is specific to the prior art topologies as depicted in 2 and 3A the soft switching in the primary is difficult to achieve for one of the complementary half bridge. This is due to the fact that the fast rise of the current in the secondary will steal some of the primary current flowing through the resonant tank formed by the magnetizing inductance of the transformer and the parasitic capacitance of the switchers.

Figure 9B:
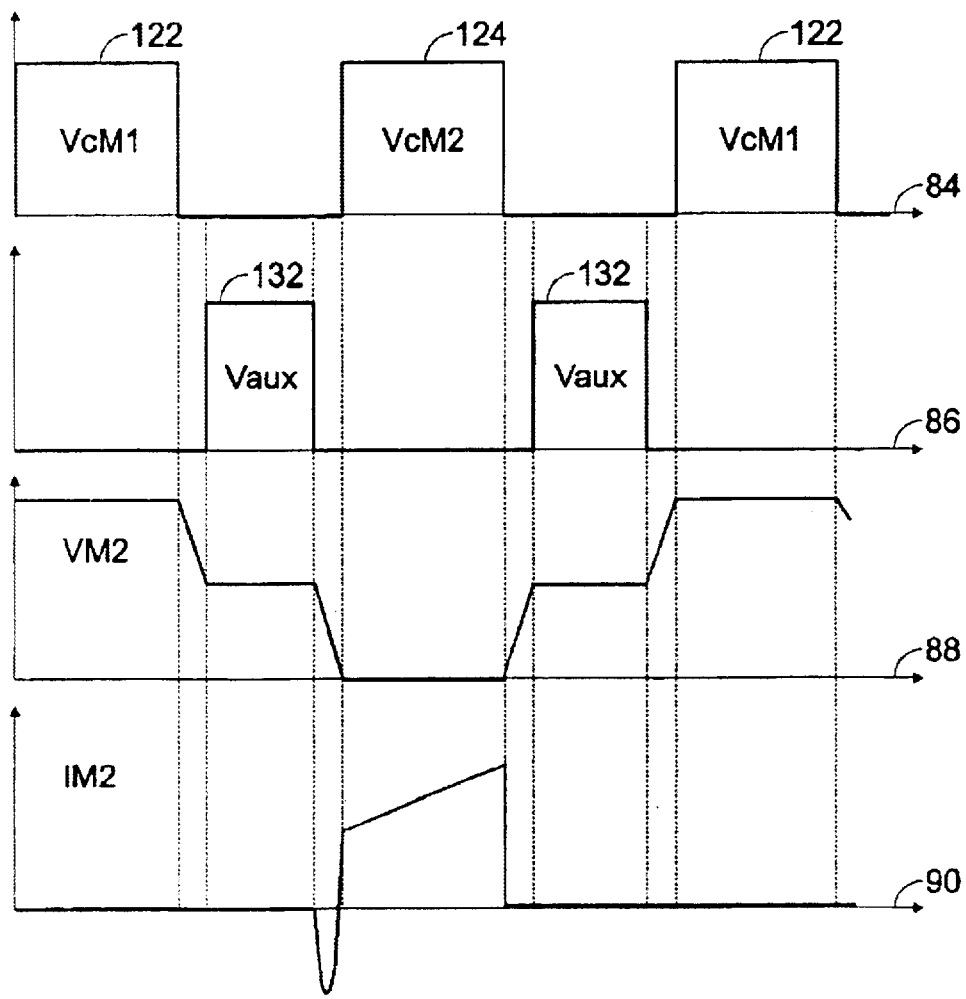
FIG. 9B is a timing diagram of the circuit of FIG. 9A.

Another circuit capable to provide the secondary voltage Vs with the bydirectional low impedance characteristics during 156, is depicted in FIG. 9A. This topology is not known by those skilled in the art. This topology is a modification of a conventional half bridge converter with the addition of a supplementary bydirectional auxiliary switch S1. The timing diagram is depicted in FIG. 9B. The switching elements 118 and 120 are controlled by the signals 122 and 124. The control signals 122 and 124 have the same duration, in between these two signals is a dead time. By increasing the duration of 122 and 124 and accordingly decreasing the duration of the dead time, the power transferred to the output can be controlled. An additional control signal 132 controls the bydirectional switch S1. The control signal 132 is turning the switch 334 ON during the dead time 910. There is a dead time between the falling edge of 122 and the rising edge of 132. There is also a dead time between the falling edge of 132 and rising edge of 124. This delay time is necessary to allow the voltage across the switching elements 118, 120 and 334 to swing in order to achieve zero voltage-switching conditions. In FIG. 9B as is depicted on 88, the voltage across the switching element 120, VM2, has a soft transition from Vin level to a voltage plateau Vin/2 during the conduction of S1 and further a soft commutation to zero after the falling edge of 132. The current through switching element 120 is depicted on 90. During the conduction of 118 there is a voltage in the secondary winding 112 of the transformer T2. This is equivalent to 154. During the conduction of 120 there is a negative voltage across 112, equivalent to 158. During the conduction of 132, there is a short circuit across the primary winding 110, which reflects in the secondary winding 112. This state is equivalent to 156.

The topology described in FIG. 9A provides in the secondary winding 112 of the transformer 106 the voltage source with the characteristics required in our embodiments. In addition to this, the circuit of FIG. 9A offers zero voltage switching conditions for both switching elements, and recycles the leakage inductance energy which is not dissipate, but used for discharging the parasitic capacitance of 118, 120 and 334.

Figure 14B:
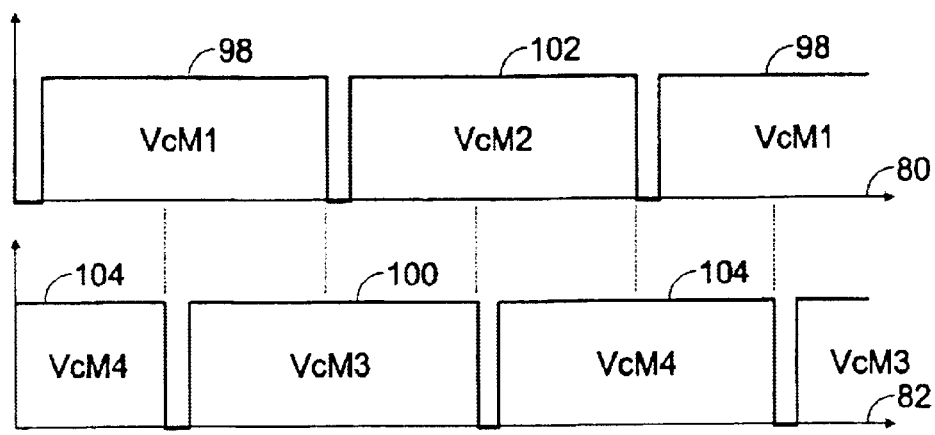
FIG. 14B is a timing diagram of the circuit of FIG. 14A.

A third circuit capable to produce the required voltage source characteristics of Vs, is presented in FIG. 14A. There are two power trains, formed by two transistor forward topologies. The first power train contains two switching elements M11 and M12, controlled by the same control signal Vc11, 968. The first power train contains also a transformer T11, 988. The second power train contains two switching elements M13 and M14. Both switching elements are controlled by the same control signal, Vc13, 972. In the second power train there is a transformer T12, 990, which has the secondary winding 980 in series with the secondary winding 978 of the transformer 988. The timing for Vc11 and Vc13 is presented in FIG. 14B, on 992 and 994. The power is modulating by the phase shift between the Vc11 and Vc13. The voltage in the secondary of the transformers 988 and 990 will substract during the overlapping time of Vc11 and Vc13, creating in the secondary the 156 signal. In the secondary in series with the secondary windings 978 and 980, there is the soft commutation inductive element Lr. The secondary rectifier means and the output filter is the one described in FIG. 4A.

Figure 1A:
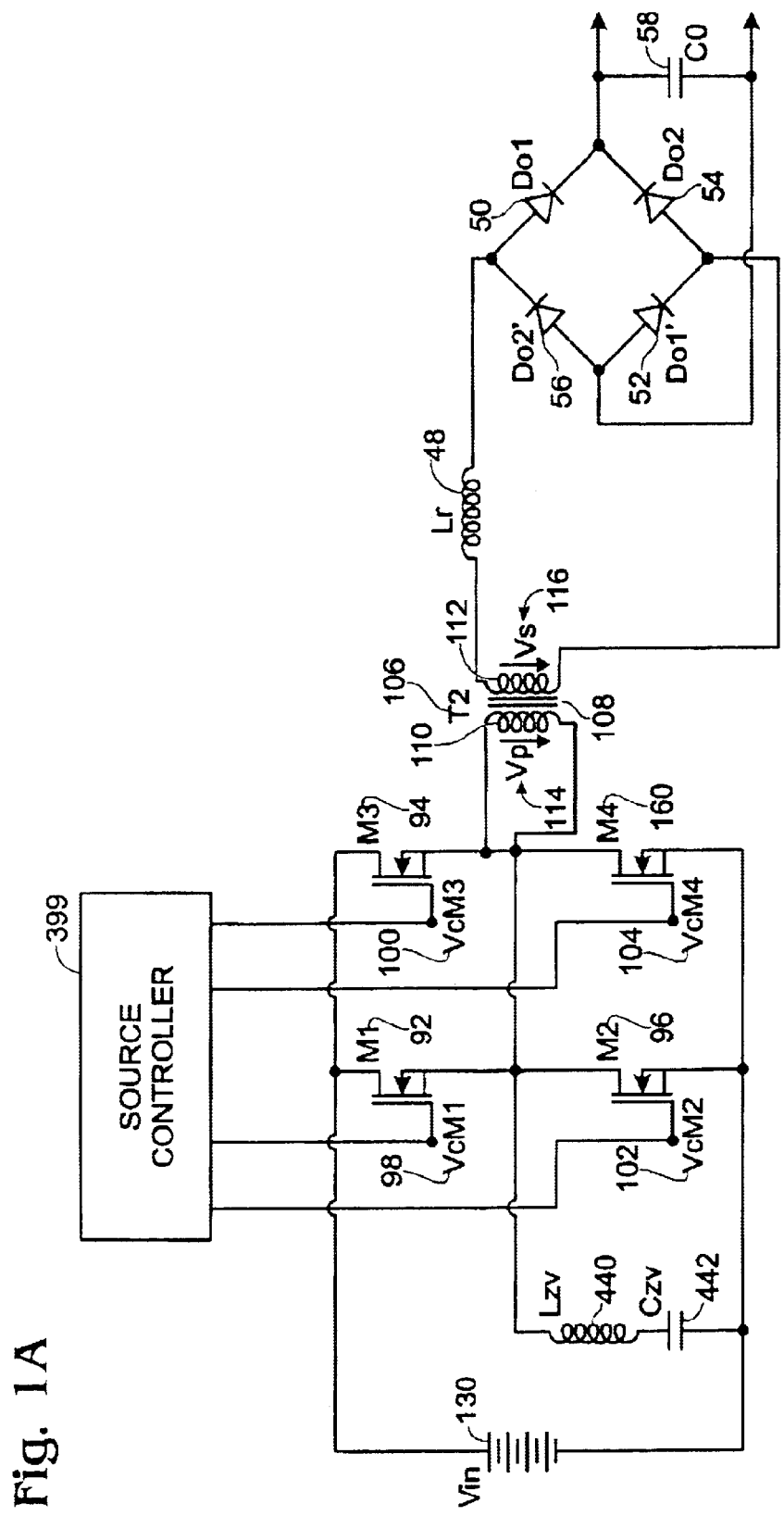
FIG. 1A is a schematic of a converter utilizing the power transfer methodology of the invention.

In FIG. 1A is depicted a circuit wherein the embodiment of FIG. 4A is combined with the circuit described in FIG. 8A. There is an additional circuit formed by an inductor element 440 and a capacitor 442. The additional circuit creates a triangular current waveform which is superimposed on the currents through M1 and M2. In FIG. 1B is presented the timing diagrams of the key waveforms of the circuit illustrated in FIG. 1A. The control signals VcM1, VcM2, VcM3, and VcM4 are produced by a source controller 399 and are applied to the transistors M1, M2, M3, and M4, respectively as shown in FIG. 1A.

The control signals for M1 and M2 are presented on 914. The control signal for M3 and M4 is presented on 916. The triangular shaped additional current 922 flowing through 440 and 442 are presented on 918. The current 924 flowing through M1 is the result of the superposition of the 922 and the current reflected from the secondary of the transformer. The presence of 918 allows zero voltage switching conditions for M1 and M2. The additional current 922 will add to the magnetizing current of transformer T2 and discharge the parasitic capacitance of M1 and M2 prior the switchers M1 and M2 are turned ON. The magnitude of 922 is controlled by the size of 440. A lower inductance of 440 will increase the additional current 922. This will ensure the zero voltage switching conditions for M1 and M2. The switchers M3 and M4 have an inherent zero voltage switching characteristics. If zero voltage switching has to be reached even at zero phase shift on both section of the full bridge, a similar circuit formed of an inductor in series with a capacitor can be inserted between the GND and the M3 and M4 at the node where the transformer T2 is inserted. The voltage across the 442 and the additional capacitor si the same and equal to Vin/2. As a result the circuit can be simplified by connecting only one inductor with center tap across the primary winding 110. The center tap of the additional inductor can be further connected to a capacitor which has the second termination connected to the GND. The capacitor 442 can also be formed by two capacitors in series one connected to the positive end of the Vin and the second capacitor connected to the negative end of 130. The common node of these capacitors is connected at 440.

Figure 13A:
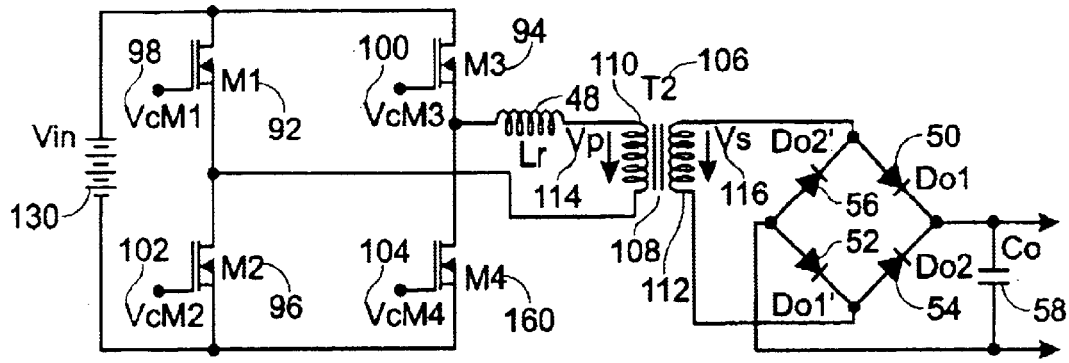
FIG. 13A is a schematic diagram of an DC-DC Converter using the embodiment presented in FIG. 4A, wherein the soft commutation inductor is transferred in primary section in series with the primary winding. The AC signal across the primary winding connected in series with the soft commutation inductor is produced by a phase shift full bridge topology depicted in FIG. 8A.

In FIG. 13A is presented the combination of the circuit presented in FIG. 4A and the full bridge phase shifted circuit depicted in FIG. 8A. The circuit presents another embodiment of the invention wherein the inductor element Lr 48 is transferred in the primary of the transformer T2. The mode of operation is similar with the circuit wherein the inductor element Lr is located in the secondary of the transformer. One advantage of this circuit is the fact that the current flowing through Lr will help to achieve zero voltage switching conditions for the primary switchers 92, 96, 94 and 160, with the penalty of an increase in the flux density in the transformer's core 108.

Figure 13B:
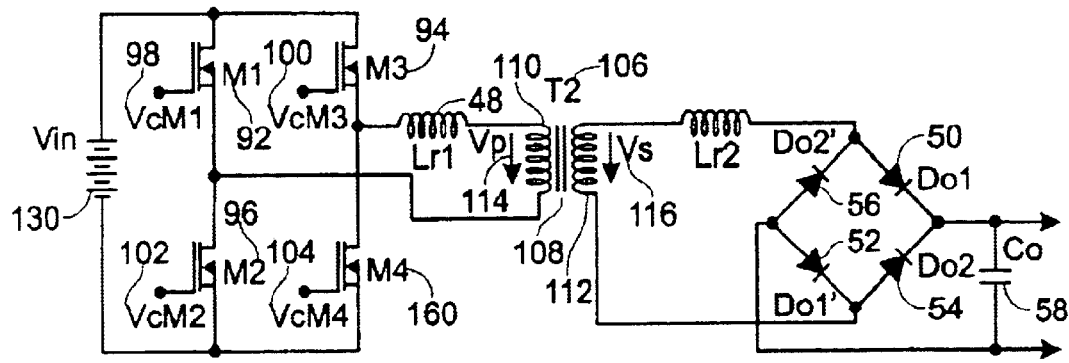
FIG. 13B is a schematic diagram of an DC-DC Converter using the embodiment presented in FIG. 4A, wherein the soft commutation inductor is split in two sections, one section transferred in primary section in series with the primary winding, and the other section in the secondary. The AC signal across the primary winding connected in series with one section of the soft commutation inductor is produced by a phase shift full bridge topology, depicted in FIG. 8A. This structure being another embodiment of the invention.

In FIG. 13B the soft commutation inductor is split in two elements, one in the primary of the transformer 48A and one in the secondary of the transformer 48B. The ratio between 48B and 48A reflected in the secondary can be chosen for the optimization of the circuit. The optimization will be chosen for different criteria function of the priority of the design. It is important to understand that Lr, Lr1 or Lr2 can be implemented by the leakage inductance of the transformer. An additional discrete inductive element in series with the equivalent leakage inductance may or may not be necessary, function of the application.

Figure 13C:
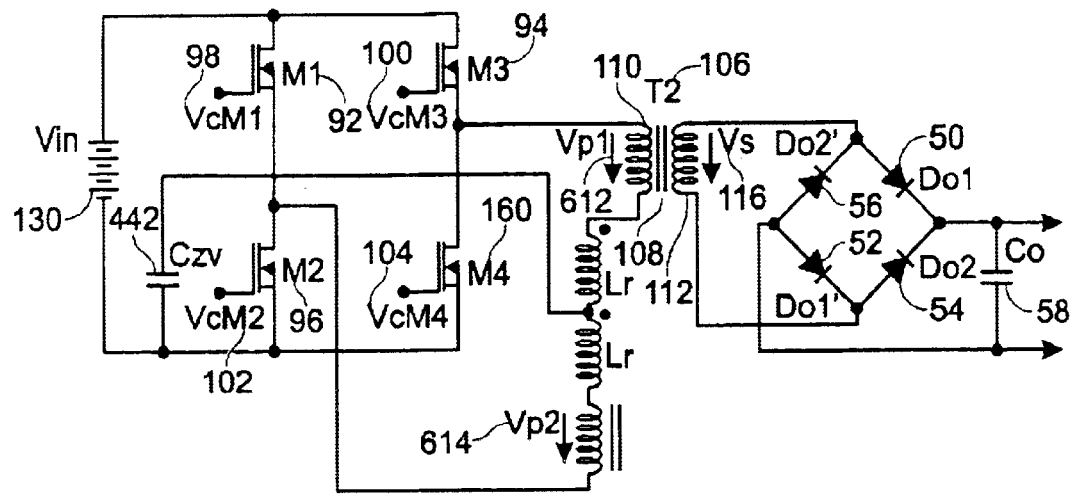
FIG. 13C is a schematic diagram of an DC-DC Converter using the embodiment presented in FIG. 4A, wherein the soft commutation inductor is transferred in primary section in series with the primary winding and providing a center tap, connected to a capacitor. The AC signal across the primary winding connected in series with one section of the soft commutation inductor is produced by a phase shift full bridge topology, depicted in FIG. 8A. This structure being another embodiment of the invention.

In FIG. 13C the soft commutation inductor element is split in two section 48C and 48D. These two sections are implemented on the same magnetic core 930. An additional capacitor Czvs 932 is inserted in between the 48C and 48D and the ground. The same effect can be reached if the 932 will be connected to positive end of 130.

There are two transformers T2 and T600, which have the primary windings 110 and 606 in series and the secondary windings 620 and 608 also in series. The invention does not limit to two transformers. It can be a number of transformers, preferable an even number and the connection to the capacitor 932 will be done in the middle having an equal number of transformers at each side of the connection.

This circuit formed by 932, 48C and 48D will add supplementary currents, which will assist in achieving, zero voltage switching for 92, 96, 94 and 160. When the diagonal switchers are conducting such as 94 and 96 or 92 and 160, the combination LrC and LrD will exhibit a higher impedance calculated in a such way to achieve optimum energy transferred to the secondary as presented in FIG. 13A. When the upper switchers 92 and 94 or the lower switchers 96 and 104 conduct the impedance between the end of 932 not connected to the GND, and the transformers T2 and T600 primary winding is very small. This will lead to circulating currents through 932, which will allow zero voltage switching conditions even at zero phase shift. This is very important in applications wherein zero voltage switching can be accomplished regardless of the phase shift.

Figure 13D:
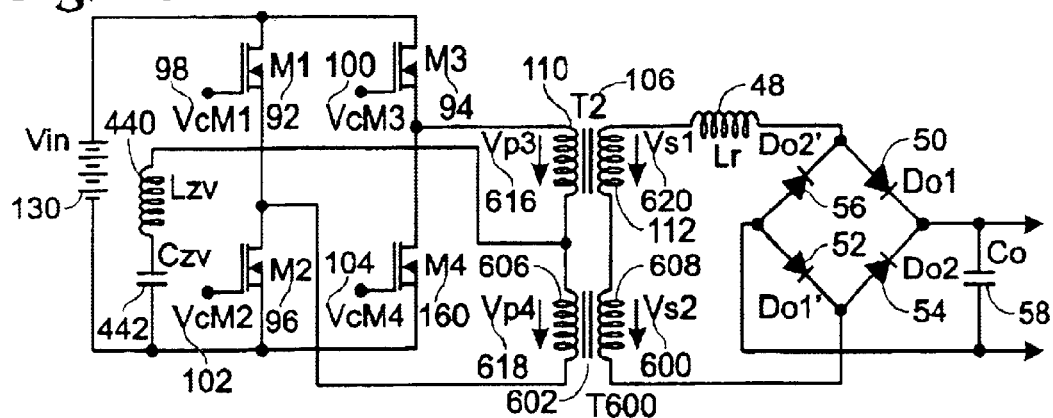
FIG. 13D is a schematic diagram of an DC-DC Converter using the embodiment presented in FIG. 4A, wherein the transformer is implemented by using two identical transformers connected in series. The additional circuit formed by an inductor in series with the capacitor is connected in between the primary ground and the connection between the two primary windings of the two transformers. The AC signal across the primary windings is produced by a phase shift full bridge topology, depicted in FIG. 8A. This structure being another embodiment of the invention.

In FIG. 13D depicts a circuit wherein the soft commutation inductor 48, is transferred to the secondary, and the LrC and LrD is substituted by Lzv 440. The combination 440 and 442 is connected in between the T2 and T600. This circuit has the advantage of providing an additional triangular current through both sections of the full bridge, M1 and M2 and also M3 and M4. This structure can offer zero voltage switching conditions on all four switching elements, 92, 96, 94 and 160 regardless of the phase shift, even at zero phase shift. This circuit offer significant advantages over the prior art, such as soft switching across the rectifiers 50, 52, 54 and 56, and also across all the switching elements in the primary regardless of load, input voltage and phase shift.

Many alterations and modifications may be made by those having ordinary skill in the art without departing from the spirit of the invention. For example, is the use of several transformers on each side of the connection between 440, 616, and 606. The capacitor 442 can be implemented by using two capacitors in series which have the non-common node connected to each end of Vin, 130.

Figure 15:
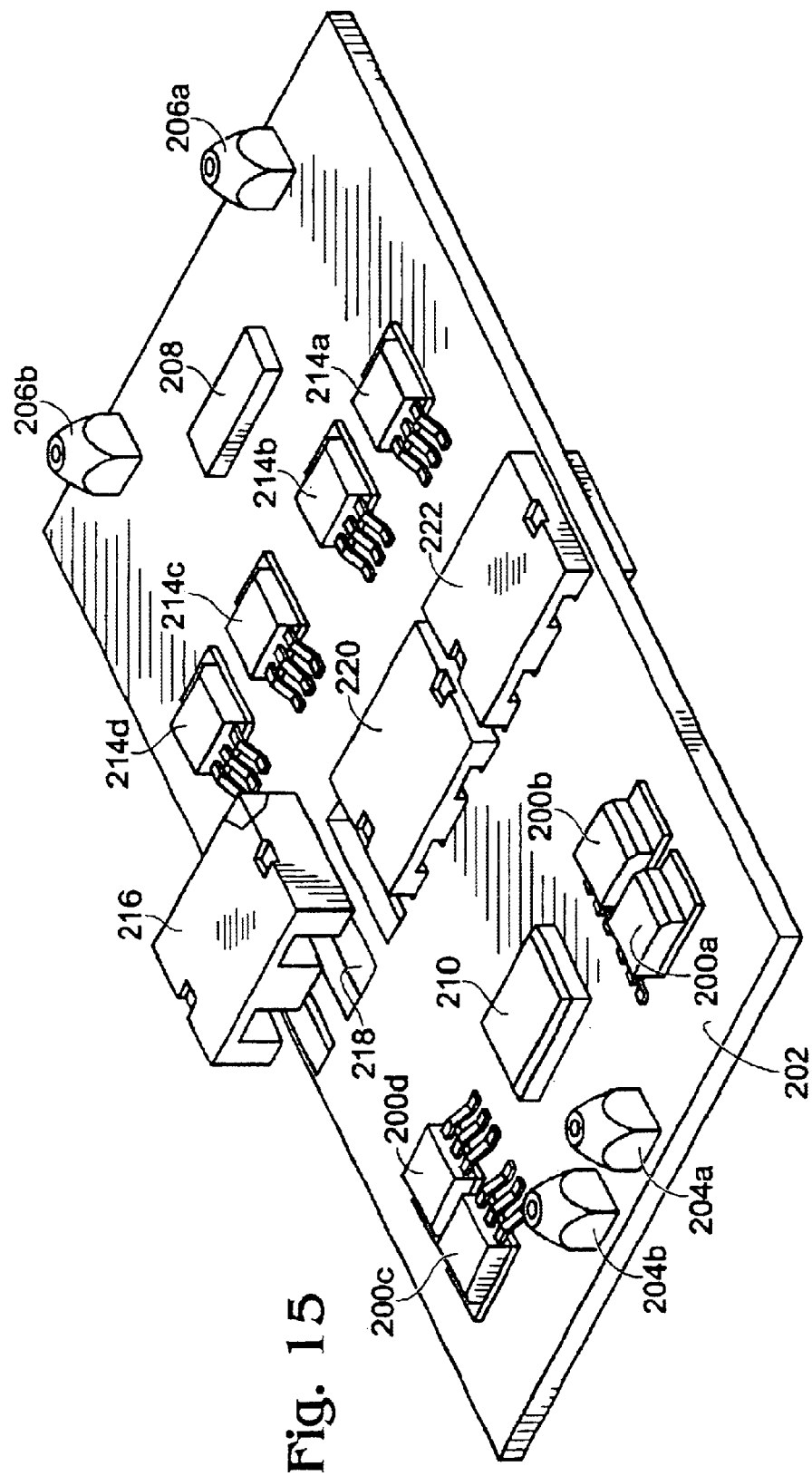
FIG. 15 presents a magnetic-packaging structure suitable for the implementation of the embodiments of the invention.

FIG. 15 presents a packaging concept suitable with this invention. All the switching elements such as 200a, 200b, 200c, 200d and 214a, 214b, 214c and 214d, are attached on a multilayers board 202, and cooled by means of via or thermally conductive inserts located under the switching elements to a base plate 932 attached under the multilayers boards 202. In between the base plate 932 and multilayers board 202 there is a thermally conductive insulation material 934. The magnetic elements are constructed using spiral traces inside of the multilayer board 202 with cutouts 218, to allow the magnetic cores 216 to penetrate through and to close the magnetic circuit with second magnetic core 936 attached from the bottom of the 202. The thermally conductive plate is interrupted under the magnetic core or it can provide cavities to accommodate them. A supplementary soft elastic material 938 with good thermal conductivity is inserted in between the core and the metal plate. Some additional electronic components such as 210, 208 can also be placed on 202. Pressed connectors such as 204a, 204b, 206b and 206c can be inserted in 202 to offer a low impedance path for the input and the output current to an external mother PCB. The advantage of this packaging is the reduction of the stray impedance associated with the interconnection between the switching elements and the magnetic elements. It offers also a solid mechanical construction suitable for demanding working environment conditions.

The invention is defined by the following claims wherein may be substituted therein for obtaining substantially the same result even when not obtained by performing substantially the same function in substantially the same way.

I claim:

1. A soft transition power converter, comprising:
    a transformer having a primary winding and a secondary winding forming at least part of a power output side of the power converter;

an alternating current source, comprising a source of DC current and a set of switching elements electrically connecting said source of DC current to said primary winding for producing alternating current in said secondary winding;

a rectifier circuit having an alternating current input for receiving said alternating current and producing a rectified current output at said power output side of the power converter;

a soft transition inductor electrically connecting said source and said primary winding; and a source controller adapted to produce said alternating current by alternating the voltage across said secondary winding from one of a negative ON time during which said voltage is negative and a positive ON time during which said voltage is positive, to a dead time wherein the voltage is substantially zero, and then to the other of said negative ON time and said positive ON time.

2. The power converter of claim 1, wherein said rectifier circuit includes a bridge of rectifiers.

3. The power converter of claim 1, wherein said rectifier circuit includes two rectifiers and two capacitors.

4. The power converter of claim 1, wherein said set of switching elements comprises two pairs of switching elements controlled by said source controller, the switching elements of each pair being coupled together in totem pole configuration at corresponding output nodes of the pair, said pairs disposed in parallel relation across said source, the output node of one of said pairs being coupled to one end of said primary winding and the output node of the other of said pairs coupled to the other end of said primary winding, each switching element having a control input coupled to said source controller.

5. The power converter of claim 4, wherein said switching elements are MOSFETS each having respectively a source, a drain, and a gate, wherein said output nodes define respective connections between the source of one of said MOSFETs and the drain of another of said MOSFETs, and wherein said gates correspond respectively to said control inputs.

6. The power converter of claim 1, wherein said source controller is adapted to short said primary winding during said dead time.

7. The power converter of claim 6, wherein said source controller is adapted to vary the duty cycle in a constant frequency mode of operation by varying the duration of said positive and negative ON times, for varying the power transferred through said transformer.

8. The power converter of claim 7, wherein said source controller is adapted for controlling said alternating current source in a discontinuous conduction mode of operation of the power converter to produce said alternating current so that substantially all of the energy stored in said at least one soft transition inductor during said first active time is transferred to said power output prior to said second active time.

9. The power converter of claim 8, wherein said source controller is adapted for controlling said alternating current source in a critical conduction mode of operation of the power converter to produce said alternating current so that substantially all of the energy stored in said at least one soft transition inductor is transferred to said power output just prior to said second active time.

10. The power converter of claim 8, wherein said source controller is adapted for controlling said alternating current source so as to vary the duty cycle by varying the duration of at least one of (a) said first and second active times, and (b) said dead time, for varying the power transferred through said transformer.

11. The power converter of claim 10, wherein said first active time is substantially equal to said second active time.

12. The power converter of claim 7, wherein said source controller is adapted for controlling said alternating current source in a continuous conduction mode of operation of the power converter to produce said alternating current so that a substantial amount of the energy stored in said at least one soft transition inductor during said first active time remains stored in said at least one soft transition inductor at the commencement of said second active time.

13. The power converter of claim 12, wherein said source controller is adapted for controlling said alternating current source so as to vary the duty cycle by varying the duration of said first and second active times, for varying the power transferred through the transformer.

14. The power converter of claim 13, wherein said first active time is substantially equal to said second active time.

15. The power converter of claim 6, wherein said source controller is adapted to provide for a variable frequency mode of operation.

16. The power converter of claim 15, wherein said source controller is adapted for controlling said alternating current source in a discontinuous conduction mode of operation of the power converter to produce said alternating current so that substantially all of the energy stored in said at least one soft transition inductor during said first active time is transferred to said power output prior to said second active time.

17. The power converter of claim 16, wherein said source controller is adapted for controlling said alternating current source in a critical conduction mode of operation of the power converter to produce said alternating current so that substantially all of the energy stored in said at least one soft transition inductor is transferred to said power output just prior to said second active time.

18. The power converter of claim 16, wherein said source controller is adapted for controlling said alternating current source so as to vary the duty cycle by varying the duration of at least one of (a) said first and second active times, and (b) said dead time, for varying the power transferred through said transformer.

19. The power converter of claim 18, wherein said first active time is substantially equal to said second active time.

20. The power converter of claim 15, wherein said source controller is adapted for controlling said alternating current source in a continuous conduction mode of operation of the power converter to produce said alternating current so that a substantial amount of the energy stored in said at least one soft transition inductor during said first active time remains stored in said at least one soft transition inductor at the commencement of said second active time.

21. The power converter of claim 20, wherein said source controller is adapted for controlling said alternating current source so as to vary the duty cycle by varying the duration of said first and second active times, for varying the power transferred through the transformer.

22. The power converter of claim 21, wherein said first active time is substantially equal to said second active time.

23. A soft transition power converter, comprising:

a transformer having a primary winding and a secondary winding forming at least part of a power output side of the power converter;

an alternating current source, comprising a source of DC current and a set of switching elements electrically connecting said source of DC current to said primary winding for producing alternating current in said secondary winding;

a rectifier circuit having an alternating current input for receiving said alternating current and producing a rectified current output at said power output side of the power converter;

a first soft transition inductor electrically connecting said secondary winding and said alternating current input of said rectifier circuit; and a source controller adapted for controlling said alternating current source so as to produce said alternating current by alternating the voltage across said primary winding a first active time during which the voltage is one of positive and negative, thence to a dead time during which the voltage is substantially zero, and thence to a second active time during which the voltage is the other of positive and negative.

24. The power converter of claim 23, wherein said rectifier circuit includes a bridge of rectifiers, and wherein said first soft transition inductor is connected between an end of said secondary winding and an input node of said bridge.

25. The power converter of claim 23, wherein said rectifier circuit includes two rectifiers and two capacitors.

26. The power converter of claim 23, wherein said set of switching elements comprises two pairs of switching elements controlled by said source controller, the switching elements of each pair being coupled together in totem pole configuration at corresponding output nodes of the pair, said pairs disposed in parallel relation across said source, the output node of one of said pairs being coupled to one end of said primary winding and the output node of the other of said pairs coupled to the other end of said primary winding, each switching element having a control input coupled to said source controller.

27. The power converter of claim 26, wherein said switching elements are MOSFETS each having respectively a source, a drain, and a gate, wherein said output nodes define respective connections between the source of one of said MOSFETs and the drain of another of said MOSFETs, and wherein said gates correspond respectively to said control inputs.

28. The power converter of claim 23, wherein said source controller is adapted to short said primary winding during said dead time.

29. The power converter of claim 28, wherein said source controller is adapted to provide for a constant frequency mode of operation.

30. The power converter of claim 29, wherein said source controller is adapted for controlling said alternating current source in a discontinuous conduction mode of operation of the power converter to produce said alternating current so that substantially all of the energy stored in said at least one soft transition inductor during said first active time is transferred to said power output prior to said second active time.

31. The power converter of claim 30, wherein said source controller is adapted for controlling said alternating current source in a critical conduction mode of operation of the power converter to produce said alternating current so that substantially all of the energy stored in said at least one soft transition inductor is transferred to said power output just prior to said second active time.

32. The power converter of claim 30, wherein said source controller is adapted for controlling said alternating current source so as to vary the duty cycle by varying the duration of at least one of (a) said first and second active times, and (b) said dead time, for varying the power transferred through said transformer.

33. The power converter of claim 32, wherein said first active time is substantially equal to said second active time.

34. The power converter of claim 29, wherein said source controller is adapted for controlling said alternating current source in a continuous conduction mode of operation of the power converter to produce said alternating current so that a substantial amount of the energy stored in said at least one soft transition inductor during said first active time remains stored in said at least one soft transition inductor at the commencement of said second active time.

35. The power converter of claim 34, wherein said source controller is adapted for controlling said alternating current source so as to vary the duty cycle by varying the duration of said first and second active times, for varying the power transferred through the transformer.

36. The power converter of claim 35, wherein said first active time is substantially equal to said second active time.

37. The power converter of claim 29, further comprising a second soft transition inductor electrically connecting said source and said primary winding.

38. The power converter of claim 37, wherein said source controller is adapted for controlling said alternating current source in a discontinuous conduction mode of operation of the power converter to produce said alternating current so that substantially all of the energy stored in said at least one soft transition inductor during said first active time is transferred to said power output prior to said second active time.

39. The power converter of claim 38, wherein said source controller is adapted for controlling said alternating current source in a critical conduction mode of operation of the power converter to produce said alternating current so that substantially all of the energy stored in said at least one soft transition inductor is transferred to said power output just prior to said second active time.

40. The power converter of claim 38, wherein said source controller is adapted for controlling said alternating current source so as to vary the duty cycle by varying the duration of at least one of (a) said first and second active times, and (b) said dead time, for varying the power transferred through said transformer.

41. The power converter of claim 40, wherein said first active time is substantially equal to said second active time.

42. The power converter of claim 37, wherein said source controller is adapted for controlling said alternating current source in a continuous conduction mode of operation of the power converter to produce said alternating current so that a substantial amount of the energy stored in said at least one soft transition inductor during said first active time remains stored in said at least one soft transition inductor at the commencement of said second active time.

43. The power converter of claim 42, wherein said source controller is adapted for controlling said alternating current source so as to vary the duty cycle by varying the duration of said first and second active times, for varying the power transferred through the transformer.

44. The power converter of claim 43, wherein said first active time is substantially equal to said second active time.

45. The power converter of claim 28, wherein said source controller is adapted to provide for a variable frequency mode of operation.

46. The power converter of claim 45, wherein said source controller is adapted for controlling said alternating current source in a discontinuous conduction mode of operation of the power converter to produce said alternating current so that substantially all of the energy stored in said at least one soft transition inductor during said first active time is transferred to said power output prior to said second active time.

47. The power converter of claim 46, wherein said source controller is adapted for controlling said alternating current source in a critical conduction mode of operation of the power converter to produce said alternating current so that substantially all of the energy stored in said at least one soft transition inductor is transferred to said power output just prior to said second active time.

48. The power converter of claim 46, wherein said source controller is adapted for controlling said alternating current source so as to vary the duty cycle by varying the duration of at least one of (a) said first and second active times, and (b) said dead time, for varying the power transferred through said transformer.

49. The power converter of claim 48, wherein said first active time is substantially equal to said second active time.

50. The power converter of claim 45, wherein said source controller is adapted for controlling said alternating current source in a continuous conduction mode of operation of the power converter to produce said alternating current so that a substantial amount of the energy stored in said at least one soft transition inductor during said first active time remains stored in said at least one soft transition inductor at the commencement of said second active time.

51. The power converter of claim 50, wherein said source controller is adapted for controlling said alternating current source so as to vary the duty cycle by varying the duration of said first and second active times, for varying the power transferred through the transformer.

52. The power converter of claim 51, wherein said first active time is substantially equal to said second active time.

53. A method for converting power in a power converter that includes a transformer having a primary winding and a secondary winding, a source connected to said primary winding and adapted to produce alternating electrical current in said secondary winding, a rectifier circuit for receiving and rectifying said alternating electrical current, and at least one soft transition inductor, the method comprising controlling said source so as to produce said alternating current by alternating the voltage across said primary winding a first active time during which the voltage is one of positive and negative, thence to a dead time during which the voltage is substantially zero, and thence to a second active time during which the voltage is the other of positive and negative.

54. The method of claim 53, further comprising shorting said primary winding during said dead time.

* * * * *